United States Patent
Mehrvar et al.

(10) Patent No.: US 9,661,405 B2
(45) Date of Patent: May 23, 2017

(54) SYSTEM AND METHOD FOR PHOTONIC SWITCHING

(71) Applicant: Huawei Technologies Co., Ltd., Shenzhen (CN)

(72) Inventors: Hamid Mehrvar, Kanata (CA); Eric Bernier, Ottawa (CA); Peter Ashwood-Smith, Gatineau (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 359 days.

(21) Appl. No.: 14/275,320

(22) Filed: May 12, 2014

(65) Prior Publication Data

US 2015/0289035 A1    Oct. 8, 2015

Related U.S. Application Data

(60) Provisional application No. 61/822,180, filed on May 10, 2013.

(51) Int. Cl.
*H04J 14/00* (2006.01)
*H04B 10/20* (2006.01)
(Continued)

(52) U.S. Cl.
CPC ....... *H04Q 11/0005* (2013.01); *H04L 49/356* (2013.01); *H04Q 11/0066* (2013.01);
(Continued)

(58) Field of Classification Search
CPC .............. H04Q 11/00; H04Q 11/0066; H04Q 11/0005; H04Q 14/0258;
(Continued)

(56) References Cited

U.S. PATENT DOCUMENTS 5,091,905 A * 2/1992 Amada ................. H04L 49/357
370/415
6,487,332 B1 * 11/2002 Rasala ............... H04Q 11/0005
385/16
(Continued)

FOREIGN PATENT DOCUMENTS

WO    2007056713 A2    5/2007
WO    2013049675 A1    4/2013
(Continued)

OTHER PUBLICATIONS

Papadimitriou, G. et al., "Optical Switching: Switch Fabrics, Techniques, and Architectures," Journal of Lightwave Technology, vol. 21, No. 2, Feb. 2003, 22 pgs.
(Continued)

*Primary Examiner* — Ken N Vanderpuye
*Assistant Examiner* — Abbas H Alagheband
(74) *Attorney, Agent, or Firm* — Slater Matsil, LLP

(57) ABSTRACT

In one embodiment, method of photonic packet switching includes receiving, by a photonic switching fabric from a first top-of-rack (TOR) switch, a destination port request corresponding to a first photonic packet and a first period of time, where the destination port request includes a first output port and determining whether the first output port is available during the first period of time. The method also includes receiving, by the photonic switching fabric from the first TOR switch, the first photonic packet and routing the first photonic packet to the first output port when the first output port is available during the first period of time. Additionally, the method includes routing the first photonic packet to an alternative output port when the first output port is not available.

22 Claims, 19 Drawing Sheets

(51) Int. Cl.
   *H04B 10/00* (2013.01)
   *H04B 17/00* (2015.01)
   *H04Q 11/00* (2006.01)
   *H04L 12/931* (2013.01)
(52) U.S. Cl.
   CPC ............... *H04Q 2011/005* (2013.01); *H04Q 2011/0033* (2013.01); *H04Q 2011/0037* (2013.01); *H04Q 2011/0045* (2013.01)
(58) Field of Classification Search
   CPC ... H04Q 2011/0039; H04Q 2011/0064; H04Q 2011/0024; H04Q 2011/0033; H04Q 2011/0037; H04Q 2011/0045; H04Q 2011/005; H04L 49/356
   USPC ............... 398/48, 49, 50, 51, 56, 79, 46, 54
   See application file for complete search history.

(56) References Cited

U.S. PATENT DOCUMENTS

| | | | | | |
|---|---|---|---|---|---|
| 6,714,552 | B1 * | 3/2004 | Cotter | H04L 45/02 | 370/256 |
| 6,735,199 | B1 * | 5/2004 | Ofek | H04L 12/5693 | 370/389 |
| 6,816,487 | B1 * | 11/2004 | Roberts | H04Q 3/68 | 370/358 |
| 6,876,649 | B1 * | 4/2005 | Beshai | H04Q 11/0005 | 370/355 |
| 6,920,135 | B1 * | 7/2005 | Lea | H04L 49/1507 | 370/389 |
| 7,120,157 | B2 * | 10/2006 | Xue | H04L 45/00 | 370/392 |
| 7,245,829 | B1 * | 7/2007 | Sindile | H04J 14/0227 | 398/45 |
| 7,272,312 | B2 * | 9/2007 | Sato | H04Q 11/0005 | 398/47 |
| 7,403,473 | B1 * | 7/2008 | Mehrvar | H04L 1/22 | 370/217 |
| 7,869,362 | B2 * | 1/2011 | Ashwood-Smith | H04L 49/25 | 370/235 |
| 8,064,341 | B2 * | 11/2011 | Beshai | H04L 45/62 | 370/230 |
| 8,295,700 | B2 * | 10/2012 | Shields | H04J 14/0283 | 398/45 |
| 8,831,000 | B2 * | 9/2014 | Mishra | H04L 12/185 | 370/252 |
| 8,971,321 | B2 * | 3/2015 | Graves | H04Q 11/0005 | 370/389 |
| 2002/0018263 | A1 * | 2/2002 | Ge | H04L 49/106 | 398/87 |
| 2002/0024700 | A1 * | 2/2002 | Yokoyama | H04Q 11/0066 | 398/98 |
| 2002/0027686 | A1 * | 3/2002 | Wada | H04Q 11/0005 | 398/87 |
| 2002/0037130 | A1 * | 3/2002 | McBride | G02B 6/3538 | 385/16 |
| 2002/0131675 | A1 * | 9/2002 | Litvin | G02B 6/12004 | 385/16 |
| 2002/0191250 | A1 * | 12/2002 | Graves | H04Q 11/0066 | 398/82 |
| 2003/0133641 | A1 * | 7/2003 | Yoo | B82Y 20/00 | 385/14 |
| 2003/0161303 | A1 * | 8/2003 | Mehrvar | H04L 12/5693 | 370/386 |
| 2004/0037558 | A1 * | 2/2004 | Beshai | H04Q 11/0005 | 398/57 |
| 2006/0165081 | A1 * | 7/2006 | Benner | H04L 45/00 | 370/390 |
| 2007/0091828 | A1 * | 4/2007 | Ashwood-Smith | H04L 29/12783 | 370/256 |
| 2008/0131128 | A1 * | 6/2008 | Ota | H04J 14/0201 | 398/79 |
| 2010/0036903 | A1 * | 2/2010 | Ahmad | H04L 67/1002 | 709/202 |
| 2011/0032936 | A1 * | 2/2011 | Ashwood-Smith | H04L 12/18 | 370/390 |
| 2011/0217039 | A1 * | 9/2011 | Smith | H04J 14/02 | 398/49 |
| 2012/0014387 | A1 * | 1/2012 | Dunbar | H04L 12/4625 | 370/395.53 |
| 2012/0099863 | A1 * | 4/2012 | Xu | H04Q 11/0005 | 398/49 |
| 2012/0155467 | A1 * | 6/2012 | Appenzeller | H04L 45/54 | 370/392 |
| 2012/0275783 | A1 * | 11/2012 | Kitajima | H04J 14/0267 | 398/27 |
| 2013/0022352 | A1 * | 1/2013 | Yamashita | H04J 14/0212 | 398/34 |
| 2013/0051809 | A1 * | 2/2013 | Mehrvar | H04B 10/032 | 398/208 |
| 2013/0086236 | A1 * | 4/2013 | Baucke | H04L 45/50 | 709/223 |
| 2013/0108259 | A1 * | 5/2013 | Srinivas | H04Q 3/0083 | 398/25 |
| 2013/0125124 | A1 * | 5/2013 | Kempf | G06F 9/45533 | 718/1 |
| 2013/0265886 | A1 * | 10/2013 | Leong | H04L 43/10 | 370/250 |
| 2013/0287397 | A1 * | 10/2013 | Frankel | H04B 10/271 | 398/50 |
| 2014/0056371 | A1 * | 2/2014 | Ji | H04L 27/2697 | 375/260 |
| 2014/0098813 | A1 * | 4/2014 | Mishra | H04L 12/185 | 370/390 |
| 2014/0161450 | A1 * | 6/2014 | Graves | H04Q 11/0005 | 398/51 |
| 2014/0161451 | A1 * | 6/2014 | Graves | H04W 76/04 | 398/51 |
| 2014/0269351 | A1 * | 9/2014 | Graves | H04L 49/10 | 370/250 |

FOREIGN PATENT DOCUMENTS

| | | | | |
|---|---|---|---|---|
| WO | | 2013049875 A1 | 4/2013 | |
| WO | WO 2013/049675 A1 * | | 4/2013 | ............. H04L 12/28 |

OTHER PUBLICATIONS

PCT International Search Report and Written Opinion, International Application No. PCT/US2014/037724, Applicant Huawei Technologies Co., LTD, dated Sep. 11, 2014, 11 pages.
Beheshti, N., et al., "Optical Packet Buffers for Backbone Internet Routers," IEEE/ACM Transactions on Networking, vol. 18, No. 5, Oct. 2010, pp. 1599-1609.
Baresi, M., et al. "Deflection Routing Effectiveness in Full-Optical IP Packet Switching Networks," ICC '03. IEEE International Conference on Communications, vol. 2, May 11-15, 2003, pp. 1360-1364.
Burmeister, E.F. et al. "A Comparison of Optical Buffering Technologies," Article in Press, Optical Switching and Networking, Received Apr. 15, 2007, Accepted Jul. 4, 2007, 9 pgs.
Chen, Y. et al. "Optical burst switching (OBS): A New Area in Optical Networking Research," Network, IEEE, vol. 18, No. 3, May-Jun. 2004, pp. 1-13.
Pattavina, A., "Architectures and Performance of Optical Packet Switching Nodes for IP Networks," Journal of Lightwave Technology, vol. 23, No. 3, Mar. 2005, pp. 1023-1032.

* cited by examiner ic switching. The present invention relates to a system and method for optical communications, and, in particular, to a system and method for photonic switching.

SYSTEM AND METHOD FOR PHOTONIC SWITCHING

This application claims the benefit of U.S. Provisional Application Ser. No. 61/822,180 filed on May 10, 2013, and entitled "System and Method for Contention Resolution using Deflection Policies in Pure Photonic Packet Switch," which application is hereby incorporated herein by reference.

TECHNICAL FIELD

The present invention relates to a system and method for optical communications, and, in particular, to a system and method for photonic switching.

BACKGROUND

Growth of internet traffic, fueled by the growth in the number of users and by increasing numbers of applications, results in a higher demand for bandwidth. This growth entails larger packet networks with greater switching capabilities. Data centers contain huge numbers of racks of servers, racks of storage devices, and other racks, all of which are interconnected via a massive centralized packet switching resource. In data centers, electrical packet switches are used to route data packets. Electronic packet switching at very high rates involves massive cooling and space costs. Thus, photonic packet switching is desirable.

The racks of servers, storage, and input-output functions contain top of rack (TOR) switches which combine packet streams from their associated servers and/or other peripherals into a smaller number of high speed streams per TOR switch which are routed to the packet switching core. Also, TOR switches receive the returning switched streams from that resource and distribute them to servers within their rack. There may be 4×40 Gb/s streams from each TOR switch to the packet switching core, and the same number of return streams. There may be one TOR switch per rack, with hundreds to tens of thousands of racks, and hence hundreds to tens of thousands of TOR switches in a data center.

SUMMARY

An embodiment method of photonic packet switching includes receiving, by a photonic switching fabric from a first top-of-rack (TOR) switch, a destination port request corresponding to a first photonic packet and a first period of time, where the destination port request includes a first output port and determining whether the first output port is available during the first period of time. The method also includes receiving, by the photonic switching fabric from the first TOR switch, the first photonic packet and routing the first photonic packet to the first output port when the first output port is available during the first period of time. Additionally, the method includes routing the first photonic packet to an alternative output port when the first output port is not available during the first period of time.

An embodiment photonic switching fabric includes a first photonic switch and a switch controller coupled to the first photonic switch, wherein the first photonic switch is configured to be coupled to a plurality of top-of-rack (TOR) switches, where the first photonic switch includes a first plurality of input ports and a second plurality of output ports, where the second plurality of output ports is greater than the first plurality of input ports, where the switch controller is configured to determine whether a first output port is available during a first period of time in accordance with a first destination port request, where the first photonic switch is configured to connect a first input port to the first output port when the first output port is available during the first period of time, and where the first photonic switch is configured to connect the first input port to a second output port when the first output port is not available during the first period of time.

An embodiment photonic switching fabric includes a photonic packet switch and a plurality of input photonic switches including a first input photonic switch, where the plurality of input photonic switches is coupled to the photonic packet switch, where the plurality of input photonic switches is configured to be coupled to a plurality of top-of-rack (TOR) switches including a first TOR switch, where the first input switch is configured to direct a first packet from the first TOR switch to the photonic packet switch when a first output port of the photonic packet switch is available during a first period of time, and where the first input photonic switch is configured to return the photonic packet to the first TOR switch when the first output port of the photonic switching fabric is not available during the first period of time.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

One challenge in realizing photonic packet switching is contention resolution. A contention occurs when two or more packets attempt the same output port of a switch at the same time. One method of contention resolution is deflection routing. In deflection routing, contention is resolved by routing only one of the contending packets to the desired output port, while other contended packets are deflected to another path within the node or the network. Contention resolution in a pure photonic packet switching may involve asynchronous contention resolution. In an example, contended packets are returned to the source. In another example, there are more output ports to a given destination and the packet is sent to any of the available output ports. In another example, multiple packets destined for an output port have priority allowing examining the highest priority available port first.

Figure 1:
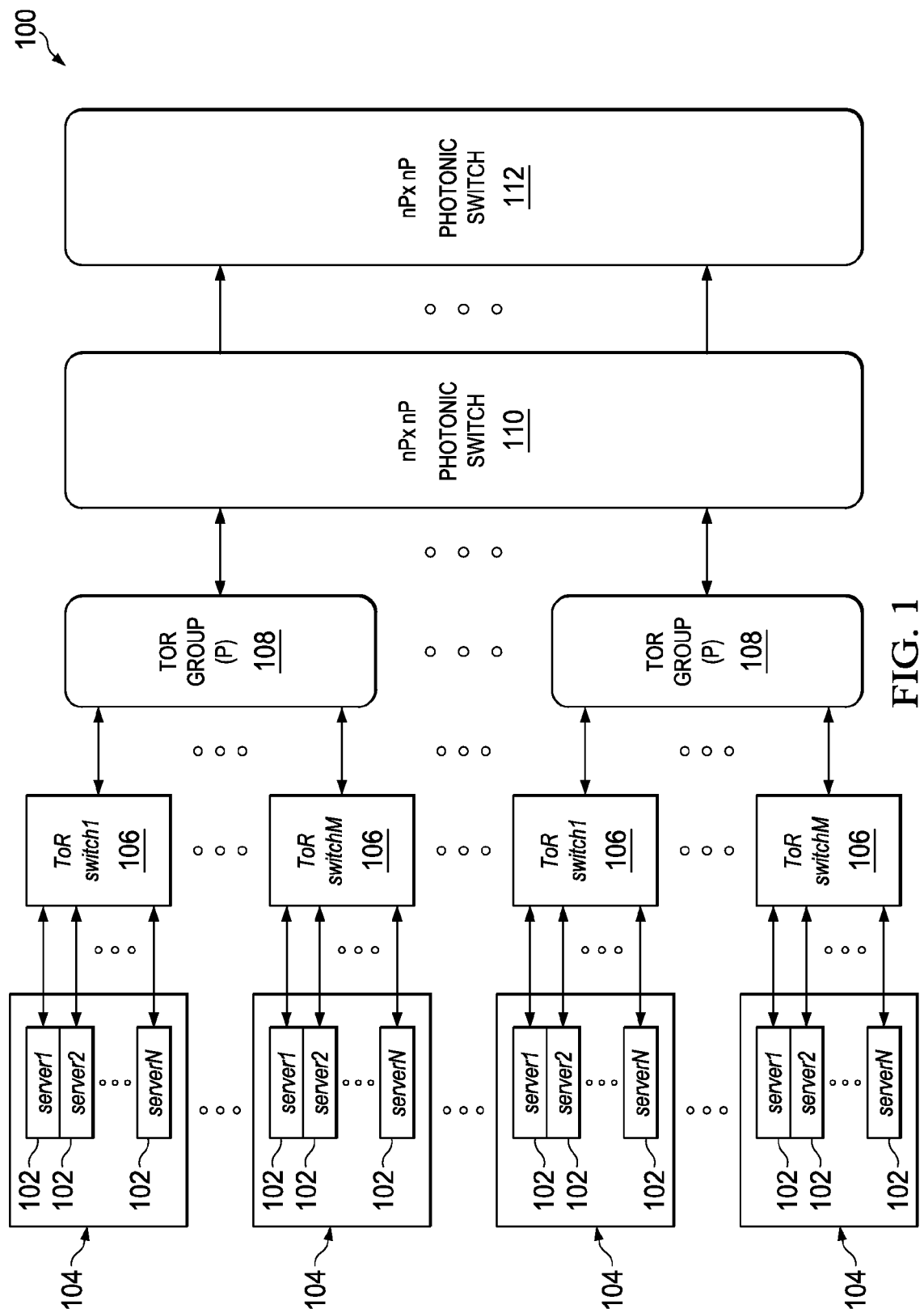
FIG. 1 illustrates an embodiment data center.

FIG. 1 illustrates data center 100, a three tier data center. Server banks 104 contain N servers 102 each. Servers of the server banks are connected to top of rack (TOR) switches 106, the smallest switches. Servers 102 and TOR switches 106 are organized in racks. TOR groups 108, cluster switches, are connected to TOR switches 106. There are M TOR switches per TOR group, and P TOR groups. TOR groups 108 are connected to photonic switches 110, an nP by nP photonic switch, with n parallel interfaces. In one example, N=48, M=32, P=32, and n=1, which has 50,000 servers. Traffic is routed from source servers of servers 102 through TOR switches 106, TOR groups 108 to be switched by photonic switch 110. Next, traffic is routed through photonic switch 112 for multihop switching. Data center 100 may include one photonic switch for single hop switching, two photonic switches as pictured in FIG. 1, or more photonic switches. Photonic switches 110 and 112 are space switches. In one example, photonic switches 110 and 112 are silicon photonic switches. The traffic then proceeds through TOR groups 108 and TOR switches 106 to destination servers of servers 102.

Figure 2:
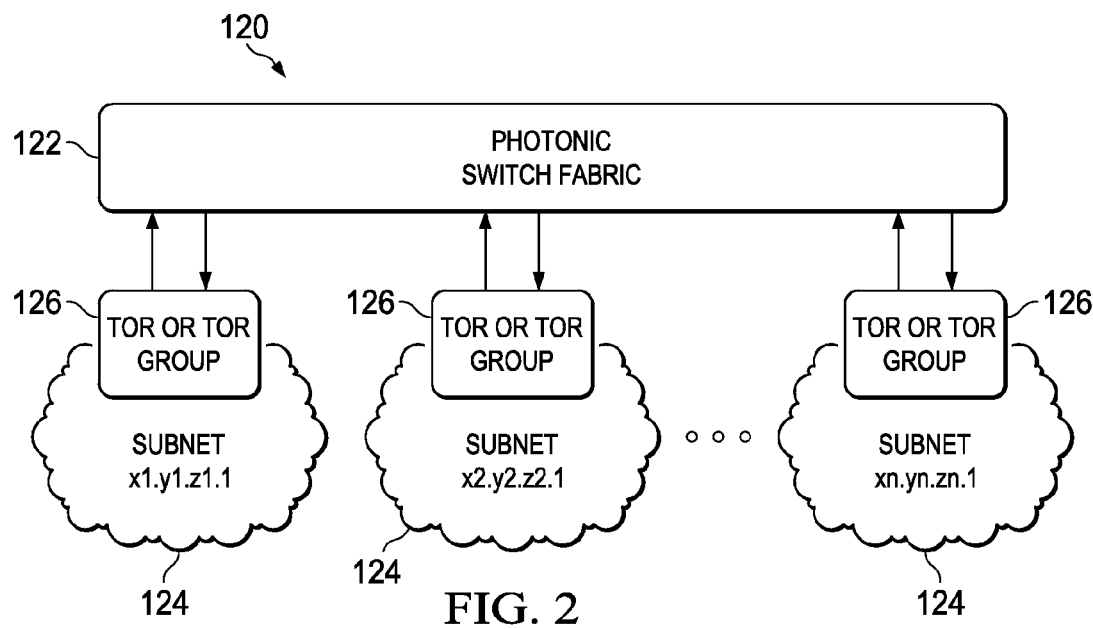
FIG. 2 illustrates an embodiment star architecture.

Another architecture that may be used for an optically bufferless packet switch is system 120 illustrated in FIG. 2. Photonic switching fabric 122 connects TORs or TOR groups 126 in a star configuration. TORs or TOR groups 126 are connected to subnetworks 124. TOR or TOR group 126 may wrap one or many packets destined to another TOR or TOR group into a photonic frame and send the frame to photonic switch 122. The photonic frame has a wavelength encoded label to represent destination TOR or TOR group. More details on photonic frame wrapping are discussed in U.S. patent application Ser. No. 14/275,520 filed on May 12, 2014, and entitled "System and Method for Photonic Switching," which application is hereby incorporated herein by reference. The wrapped photonic frame is part of the data path while the label is part of the control path. Wrapped frames may be sent on the data waveband while the label is sent on control waveband. More details on using separate wavebands for traffic and signaling are discussed in U.S. patent application Ser. No. 14/246,633 filed on Apr. 7, 2014, and entitled "System and Method for Photonic Switching," which application is hereby incorporated herein by reference.

Figure 3:
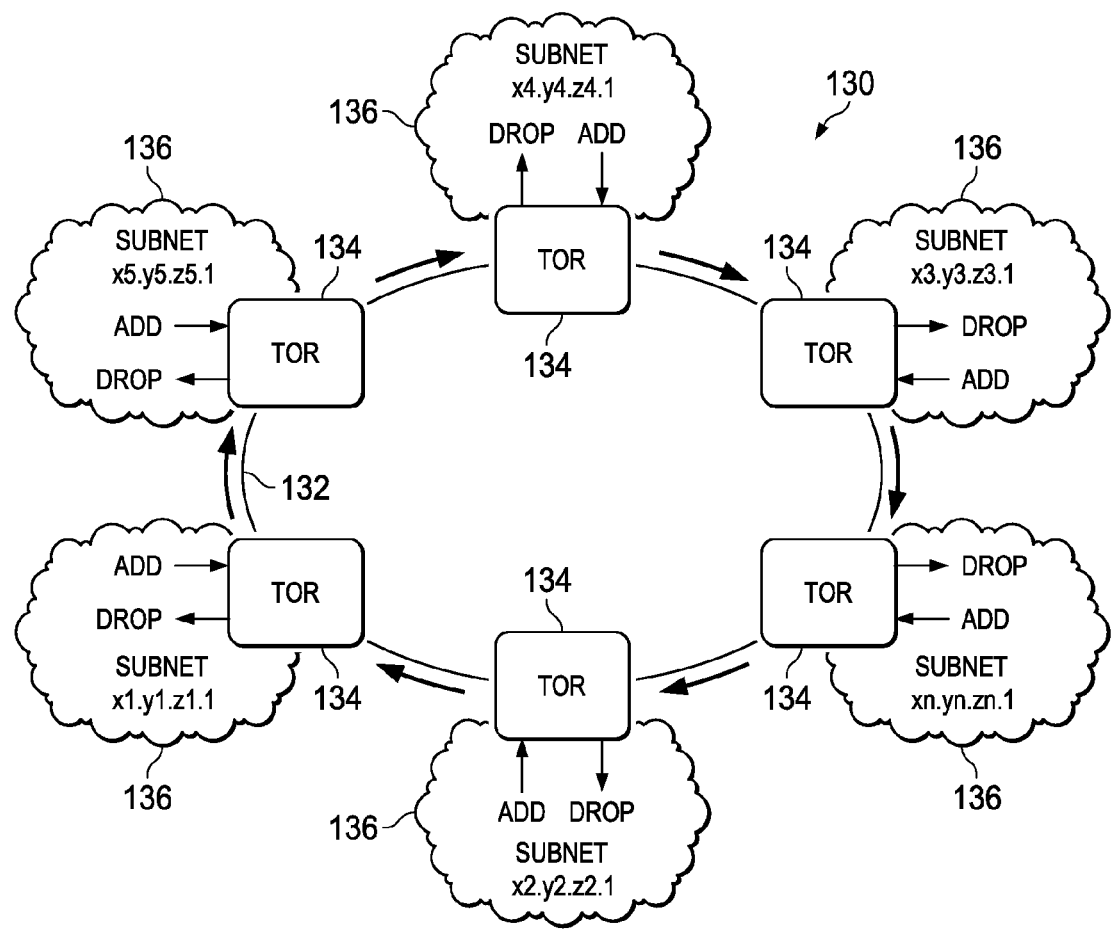
FIG. 3 illustrates an embodiment ring architecture.

In another example, illustrated by system 130 in FIG. 3, a ring architecture is used. TOR switches 134 are connected to each other in a ring by high capacity photonic ring 132. Also, TOR switches 134 are connected to subnetworks 136. In one example, high capacity photonic ring 132 has a bandwidth of 1.28 Tbps. In another example, stacks of many rings with arbitrary rates are used. In an embodiment, the control signals and data use separate wavebands. A number of wavelengths in the signaling waveband may be used for TOR or TOR group addressing. The signaling waveband carries both routing and management information. Because the number of nodes in a ring is limited, a limited number of wavelengths may be used for addressing the TOR groups. For example, out of 12 wavelengths in the 1550 nm range, some may be used to address ring nodes and some are used for management and control. The signaling waveband may also carry other control signals, such as congestion status, fairness, and management.

Figure 4:
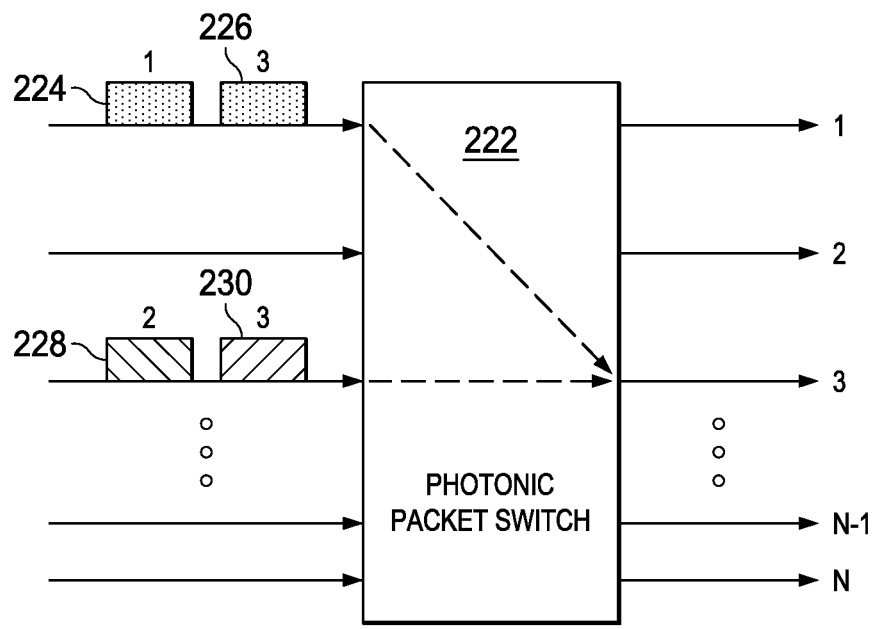
FIG. 4 illustrates incoming contending photonic packets to a photonic packet switch.

In one method of asynchronous contention resolution in photonic packet switching, when there is a contention, one contending packet is sent to the desired output port, and the other contending packets are sent back to the source. In FIG. 4, packets 224, 226, 228 and 230 are incoming on photonic switch 222. Photonic switch 222 has N input ports and 2N output ports. Packet 224 is destined for output port 1, packet 228 is destined to output port 2, and packet 226 and packet 230 are both destined for output port 3. Packets 226 and 230 are contending.

Figure 5:
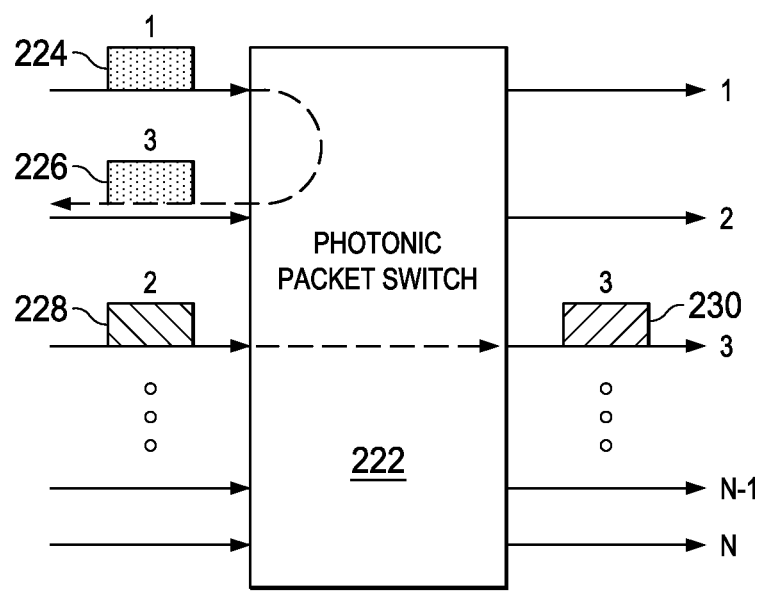
FIG. 5 illustrates a resolution of contended packets by a photonic packet switch.

Packet 230 arrives at packet switch 222 before packet 226. As shown in FIG. 5, packet 230 is routed to output 3. When packet 226 reaches photonic switch 222, output port 3 is occupied, and packet 226 is returned to the source. The source may again attempt to transmit packet 226 to output port 3. The packet may be retried a number of times. If the packet transmission is not ultimately successful because the there is an extreme contention for the desired output port, the packet may be dropped. Hence, buffering occurs at the source in the electronic domain, instead of at the photonic switch in the optical domain.

Figure 6:
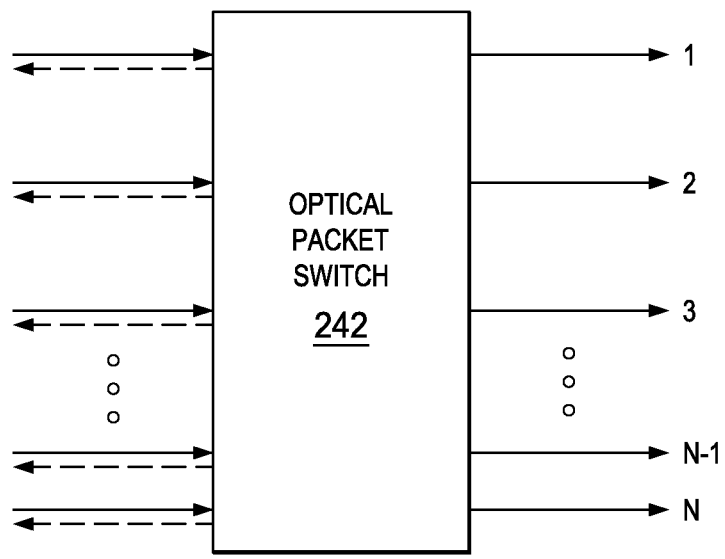
FIG. 6 illustrates an embodiment photonic switching fabric for contention resolution.

FIG. 6 illustrates photonic packet switch 242. Packet switch contains N input ports to receive packets from source TOR or TOR groups, N return output ports to return contended packets to the source TOR switches, and N output ports to transmit packets to the destination TOR switches. The additional links to return the photonic packets to the source TOR or TOR group are referred to as contention links. Thus, photonic packet switch 242 has N input ports and 2N output ports.

Figure 7:
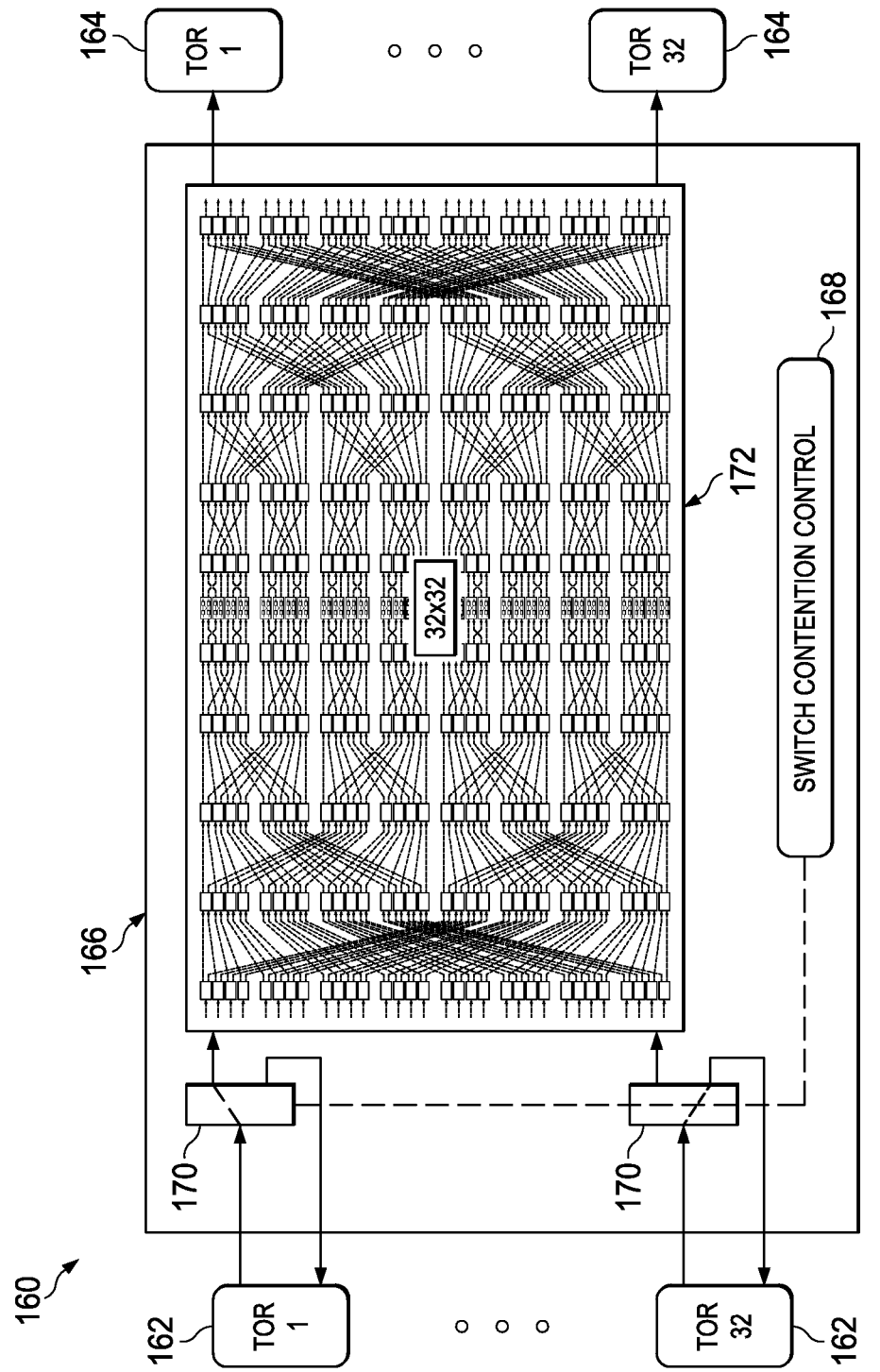
FIG. 7 illustrates another embodiment photonic switching fabric with contention resolution.

FIG. 7 illustrates photonic switching system 160. Input TOR switches 162 are coupled to photonic switching fabric 166. In particular, input TOR switches 162 transmit optical packets to input switches 170. Input switches 170 are 1:2 photonic switches which route the photonic packets either to photonic switch 172 or back to the source TOR switches. Switch contention control 168 coordinates input switches 170. When a packet label (or header) is received by an input switch, it consults switch contention control on whether the destination port is available. When the destination port is available, the packet is routed to photonic switch 172. The packet traverses the switching elements within the photonic switch 172, set up by switch controller, to reach the output that goes to destination TOR switches 164. When the output port is not available, the photonic packet is switched back to the source TOR. Photonic switch 172 is a 32×32 photonic switch. In one example, photonic switch 172 is a silicon photonic switch.

Figure 8:
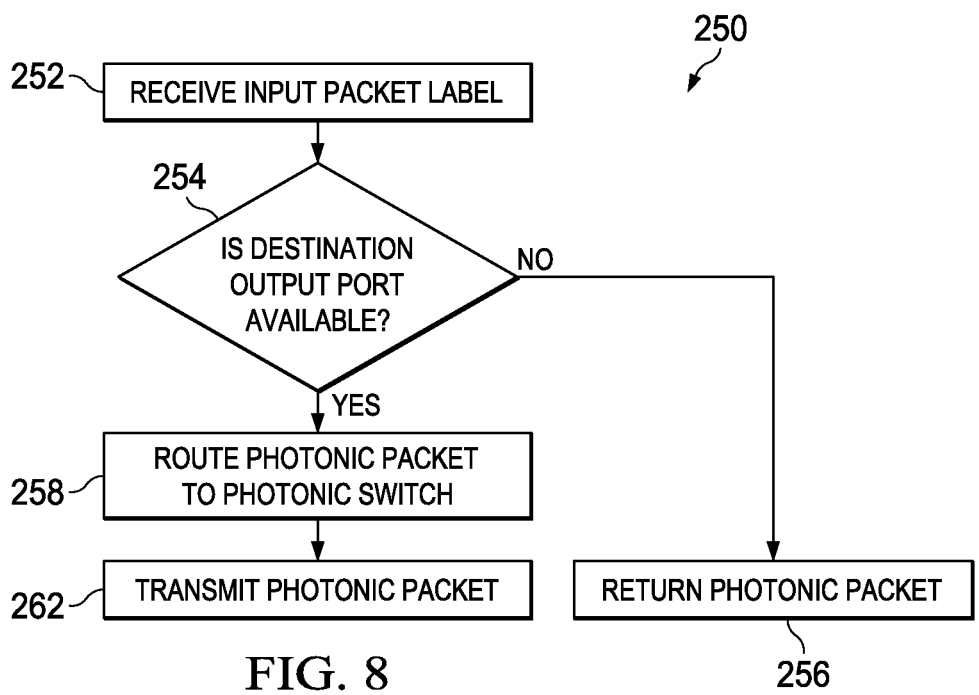
FIG. 8 illustrates a flowchart of an embodiment method of resolving contending photonic packets.

FIG. 8 illustrates flowchart 250 for a method of photonic packet switching. Initially, in step 252, the photonic switching fabric receives a photonic packet label from a source, for example from a source TOR switch. The received photonic packet is destined for a particular output port.

Then, in step 254, the photonic switching fabric determines whether the destination output port is available. The destination output port is unavailable when there is a photonic packet being routed to that output port at the time being requested. When the destination output port is not available, the photonic switching fabric proceeds to step 256, and when the destination output port is available, the photonic switching fabric proceeds to step 258.

In step 256, the photonic switching fabric returns the photonic packet to its source TOR switch. An additional output port is used to route the packet back to the source TOR switch. The source TOR switch may again attempt to transmit the packet to the destination output port.

In step 258, the photonic packet is routed to the requested output of the photonic switch. A 2:1 photonic switch may be used to route the packet either to the photonic switch or back to the source TOR switch. The photonic switching fabric may be an N×N buffer-less optical space switch.

Finally, in step 262, the photonic packet is sent to the destination TOR switch through the path established by the switch controller by examining the label information.

Figure 9:
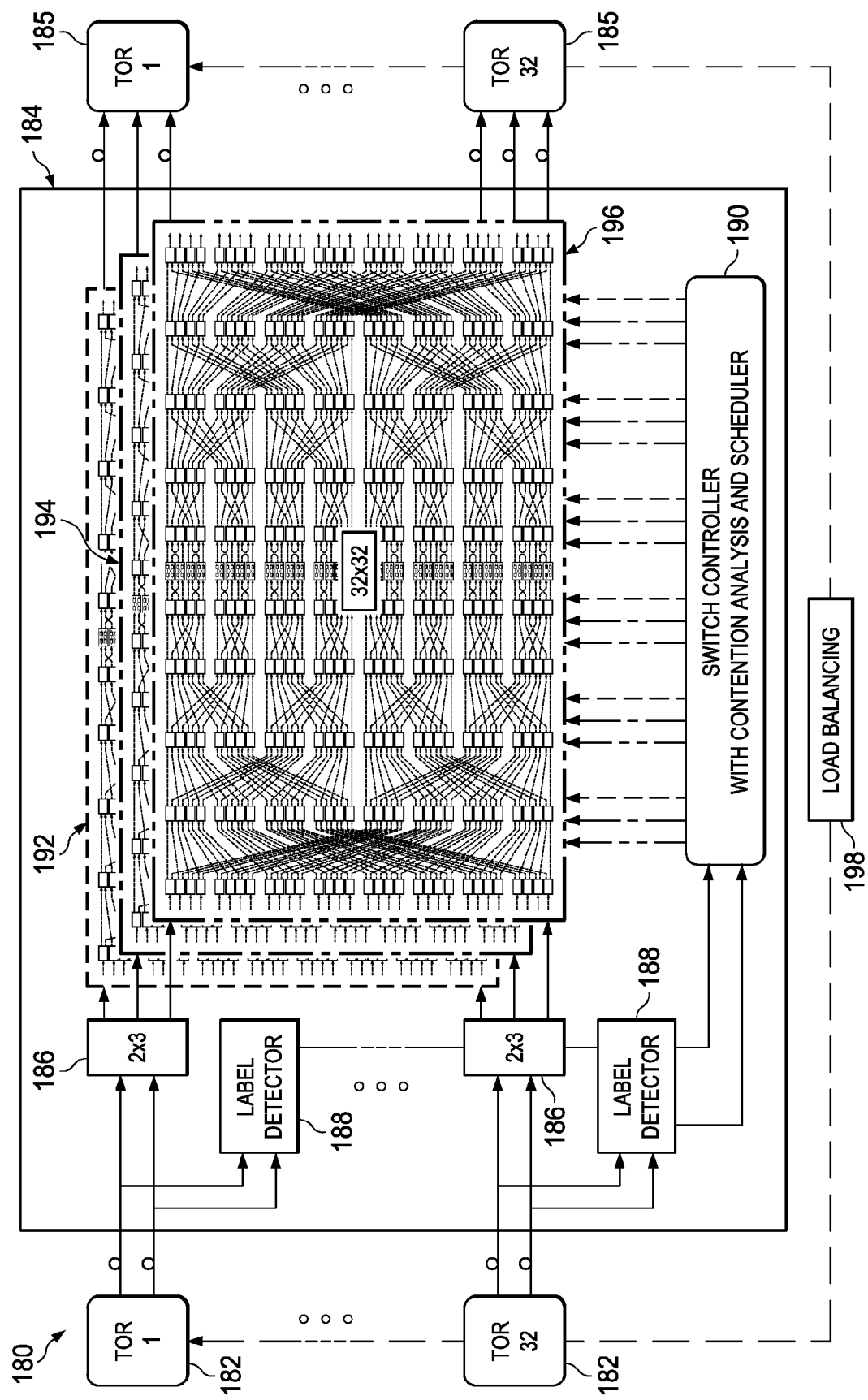
FIG. 9 illustrates an additional embodiment photonic switching fabric for contention resolution.

In another embodiment photonic switching fabric, contending photonic packets are routed to one of several output ports. Load balancing may be used. FIG. 9 illustrates photonic switching system 180 for resolving contention using deflection to a dilated part of the fabric. Input TOR switches 182 transmit photonic packets to photonic switching fabric 184.

Load balancing is performed by load balancing block 198. Load balancing equally distributes the traffic load to the output ports preventing or reducing packet loss. When load balancing is effective, the inputs and outputs have a similar traffic distribution.

A header is sent by the source TOR switches in advance of the packet. In one example, the header indicates the destination address to be routed through any of the three choices of destination port. The label is sent to either of the two input ports and read by label detectors 188. In one example, the destination address is wavelength encoded, where each wavelength indicates a bit for the destination address. The wavelengths have two power levels. Low power may represent a 0 and high power a 1, or vice versa. More details on wavelength encoding are discussed in U.S. patent application Ser. No. 13/902,085 filed on May 24, 2013, and entitled "System and Method for Multi-Wavelength Encoding," which application is hereby incorporated herein by reference.

The destination address is passed to switch controller 190. Switch controller 190 performs contention analysis and scheduling. In one example, it decides which of the three output ports are available and selects a photonic switch to connect the input on which the packet arrives to that output port. It is possible, but unlikely, given the existence of load balancer with an appropriate dilation level, that none of the choices are available. In this case, the packet is lost.

When a packet is received by photonic switching fabric 184, it is routed by photonic switches 186, 2×3 photonic switches which route the packet to the appropriate input of photonic switch 192, photonic switch 194, or photonic switch 196. The photonic packet is then switched to the appropriate output port, and sent to output TOR switches 185. The packet is switched based on the decision by switch controller 190 connected to the switching cells in the connection path. In this example, photonic packet switch 184 has N input ports and 1.5 N output ports. Each TOR sends out packet on two links and receives packets on 3 links. In one example, there are N input ports and 1.4 N output ports for photonic switching fabric 184. For an N×N photonic switch with no buffers, fully loaded traffic, and a uniform load distribution to the outputs, the probability of n of the N packets contending for the same output at the same time is the probability of n of the N packets arriving simultaneously for the same output port. Using Bernoulli's distribution, the probability is given by:

$$Pr(x = n) = \binom{N}{n}\left(\frac{1}{N}\right)^n\left(1 - \frac{1}{N}\right)^{N-n}.$$

The throughput of the system T is given by the sum of all k probabilities that at least one packet is destined to output k divided by N, given by:

$$T = \frac{1}{N}\sum_{k=0}^{N-1} Pr_k(x \geq 0).$$

However, given the symmetry of the load and the assumption of uniformly distributed packets, the throughput is given by:

$$T = Pr(x \geq 1) = 1 - Pr(x = 0) = 1 - \left(1 - \frac{1}{N}\right)^N.$$

Figure 10:
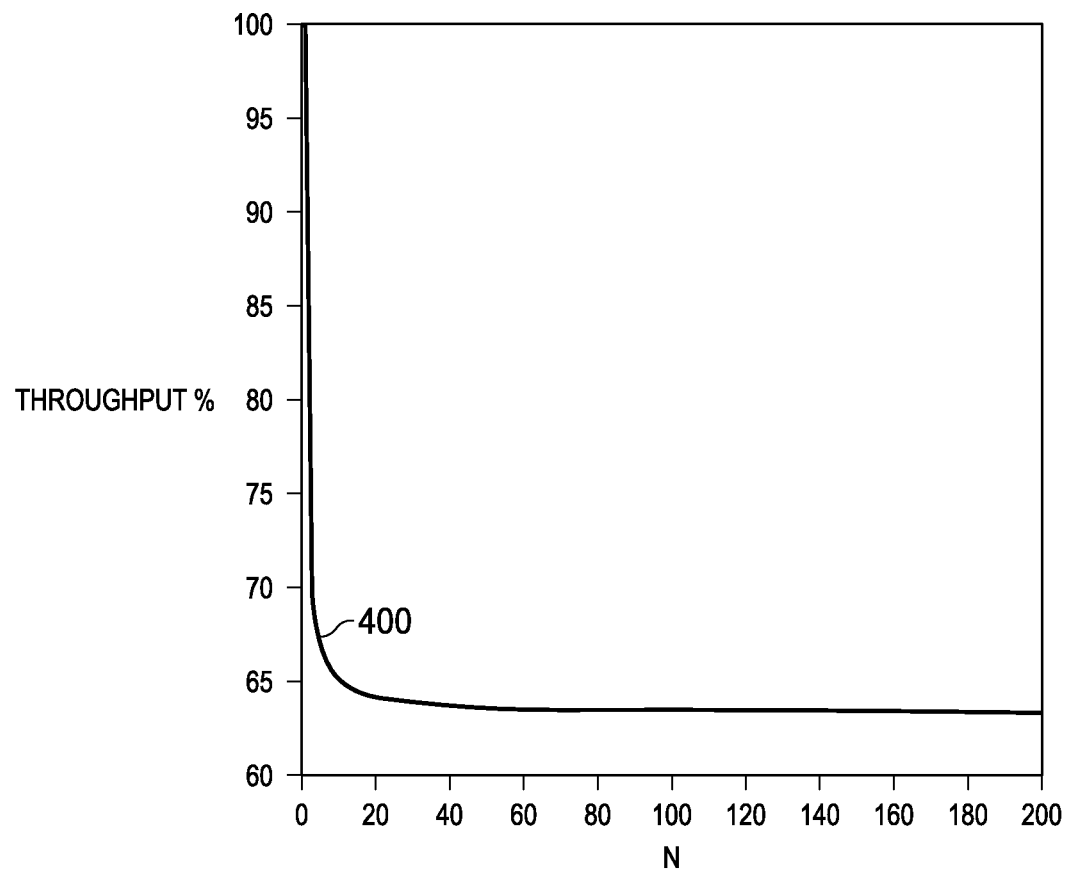
FIG. 10 illustrates a graph of throughput versus switch size.

FIG. 10 illustrates a graph of throughput 400 as a function of N. For large N, the throughput T converges to 1-1/e=63%. Thus, 37% of the packets will be lost, because there is no buffer to absorb them. This means that adding 40% additional links may absorb these contended packets. In some examples, the number of output links is 1.35, 1.37, 1.4, 1.5, 1.67, 1.75 or 2 times the number of input links.

Figure 11:
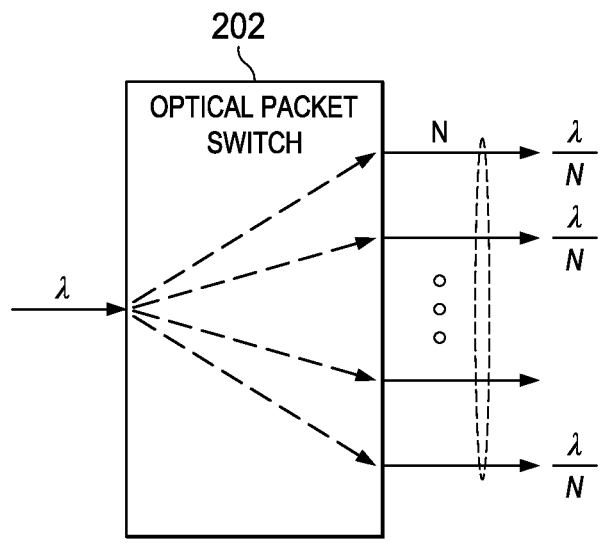
FIG. 11 illustrates output load balancing in a photonic switching fabric.

FIG. 11 illustrates output load balancing optical packet switch 202 with one input link which handles λ traffic and N outputs which handle λ/N traffic each. In load balancing, traffic to all destinations is uniformly distributed.

Figure 12:
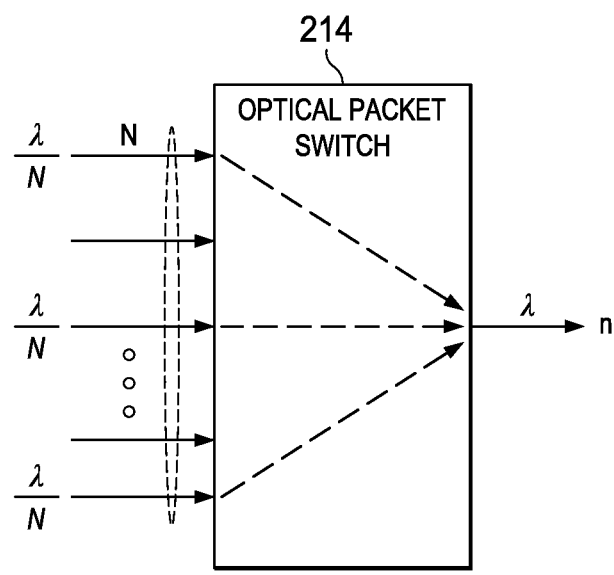
FIG. 12 illustrates input load balancing in a photonic switching fabric.

FIG. 12 illustrates input load balancing optical packet switch 214 with N inputs and one output. The N inputs each handle λ/N traffic, while the output handles λ traffic.

Figure 13:
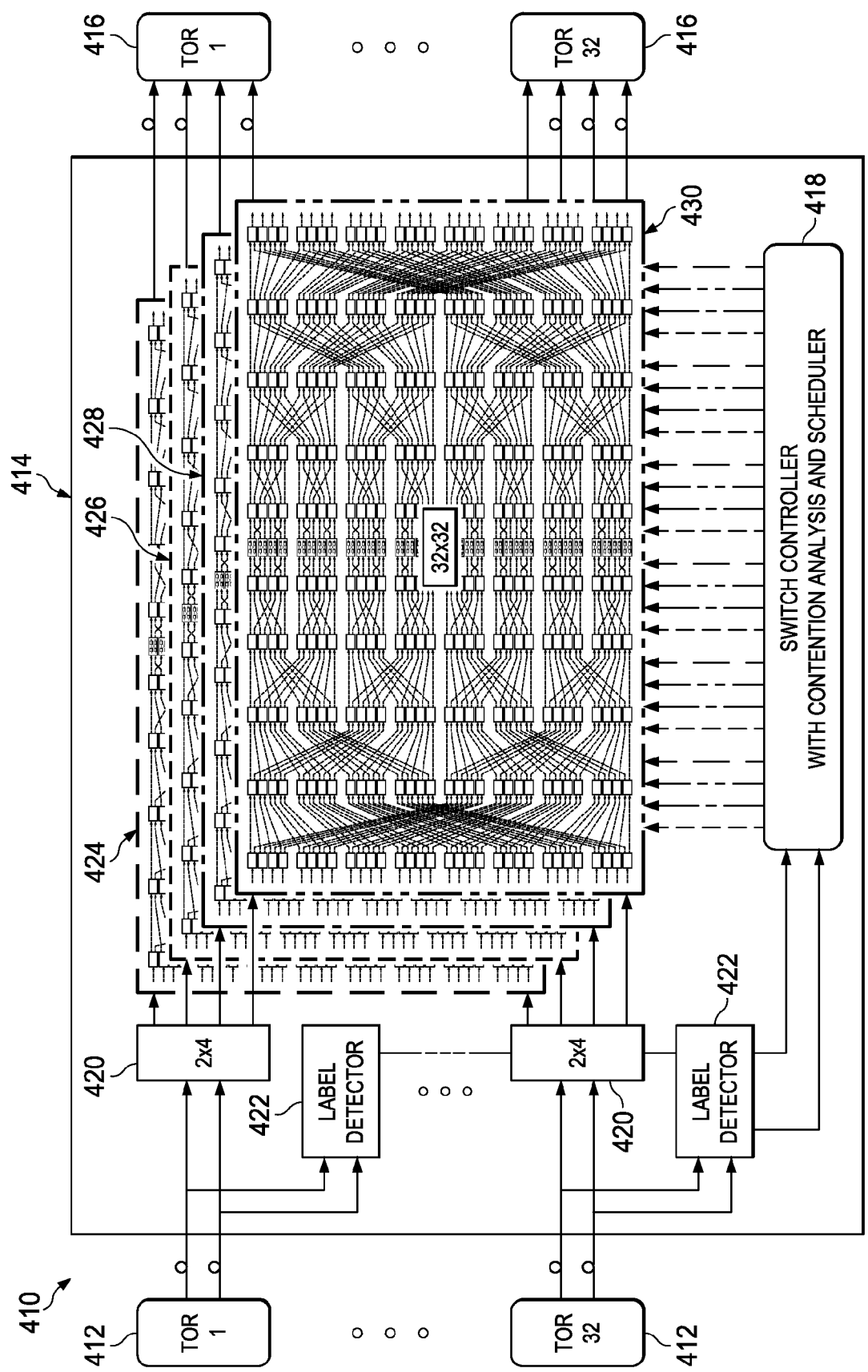
FIG. 13 illustrates another embodiment photonic switching fabric for contention resolution.

FIG. 13 illustrates photonic switching system 410, which has more dilation and less dependency on load balancing than photonic switching system 180. There may be load balancing. Photonic switching fabric 414 contains N input ports and 2N output ports. Input TOR switches 412 are coupled to photonic switching fabric 414.

The buffering requirement may be calculated when there is a uniform distribution of load across all outputs. There may be a maximum number of packets sent to the contention links. A calculation for the buffer requirement may use the Poisson distribution. Although this distribution may underestimate the buffer size for data networks, even this underestimated buffer size is problematic in photonic switches. Assuming that the switch has K containers for each output where each container can store a packet, when the number of packets arriving during transmission of a packet exceeds buffer size K, the additional packets will be lost or blocked. The blocking probability can be obtained using M/M/1/K system. In this system, the first M represents the Poisson distribution of arrival of a packet or wrap, and the second M represents transmission time (or service time) of a packet or wrap to the output port, 1 represent the number of switch links to the output destination, and K represents the number of packets or wraps that can be held for each output port. The blocking probability as a function of traffic loading of each link, ρ, with:

$$\rho = \frac{\lambda}{\mu} < 1,$$

where λ is packet arrival rate and μ is the service rate, is given by:

$$P_K = \frac{(1-\rho)\rho^K}{1-\rho^{K+1}}.$$

K can be expressed in terms of ρ and $P_K$ as:

$$K = \text{Ceiling}\left[\frac{\ln\left(\frac{P_k}{1-\rho+P_k\cdot\rho}\right)}{\ln(\rho)}\right].$$

Figure 14:
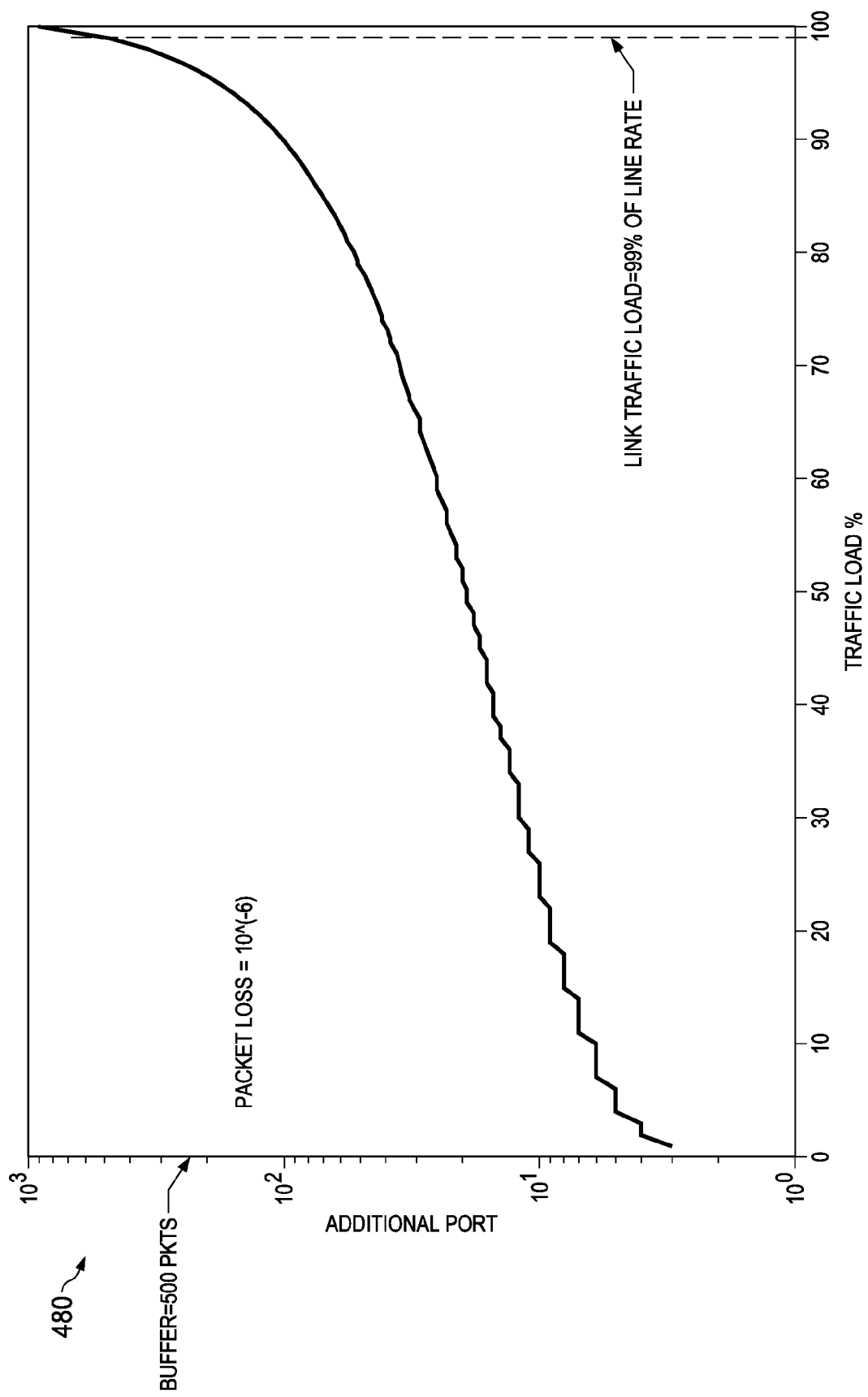
FIG. 14 illustrates a graph of the number of packets a switch buffers for each output as a function of interface load.

FIG. 14 shows graph 480 in which the number of containers required to hold packets or wraps is plotted versus traffic load on each link. This graph is plotted for a target packet loss of $P_K=10^{-6}$. For a 99% traffic loading (transmission close to the link rate), the number of containers to achieve a packet or wrap loss of $10^{-6}$ is about 500. It is problematic to have this buffer size on each link of a photonic switch.

Headers are sent in advance of the photonic packets. The headers contain four choices of output port for the photonic packet. These four choices may have equal priority and may be represented by a single table, or may have different priorities assigned by a network controller. The headers are read by label detectors 422. In one example, the header is wavelength encoded, where the presence or absence of power on a wavelength indicates one bit of the destination addresses.

The decoded addresses are sent to switch controller 418. Switch controller 418 determines which of the requested output ports are available. When the output ports have equal priority, any of the output can be assigned. When the output ports have different priorities, the highest priority output port that is available is granted to the photonic packet. Some packets may be dropped, but the probability of a packet being dropped is low.

When the packet is received by photonic switching fabric 414, it is routed by one of 2×4 input switches 420. These switches determine which input the packet is switched to.

Then, photonic switches 426, 428, 424, and 430 switch the photonic packet. These photonic switches may be silicon photonic space switches. Switch controller 418 configures the photonic switches to route the photonic packets.

The switched photonic packets are output to destination TOR switches 416.

Figure 15:
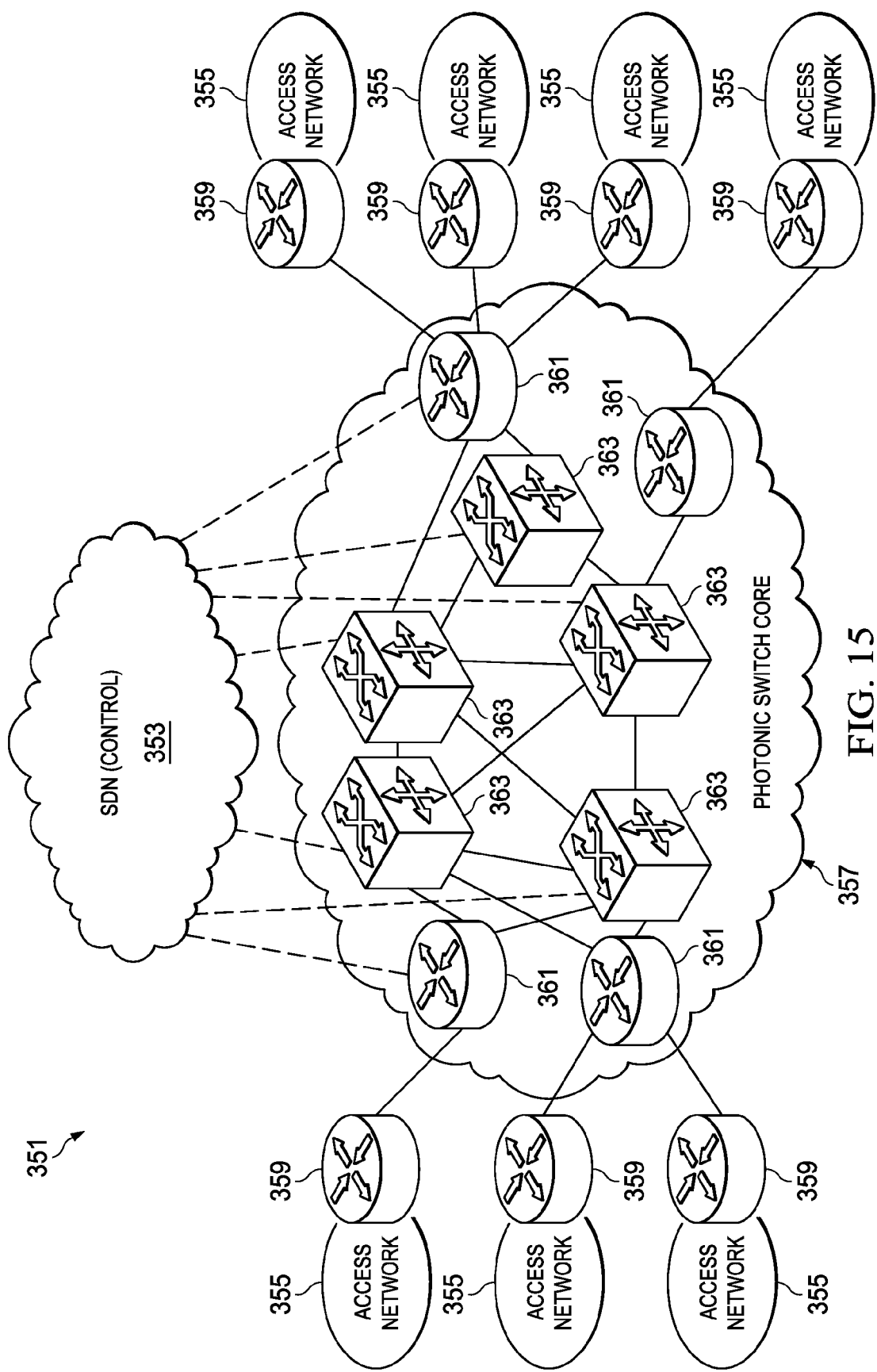
FIG. 15 illustrates an embodiment photonic network controlled by software defined networking (SDN)

FIG. 15 illustrates system 351, a memory-less optical data plane with software defined networking (SDN) for photonic frame switching with many bufferless photonic switches. System 351 has an edge buffer architecture. TORs 359 are coupled to access networks 355. TORs 358 pass packets to photonic switching core 357 for switching.

SDN controller 353 is used for source based routing. SDN controller 353 facilitates programmable control of photonic packet switching without physical access to the photonic switches, facilitating source based routing. SDN controller 353 oversees network level routing.

Photonic switching core 357 contains wrappers 361, which wrap packets to produce wrapped photonic frames. Wrappers 361 remove the IPG between packets and concatenate the packets, creating gaps between photonic frames. The gap may be about equal to the sum of the removed IPGs. In photonic switching core 357, node level routing uses a contention and load balancer.

This embodiment has edge photonic switching devices which interface between the electronic access network and the photonic core switches. Edge photonic switches may use a wrapper scheme to send the packet as photonic frames.

Figure 16:
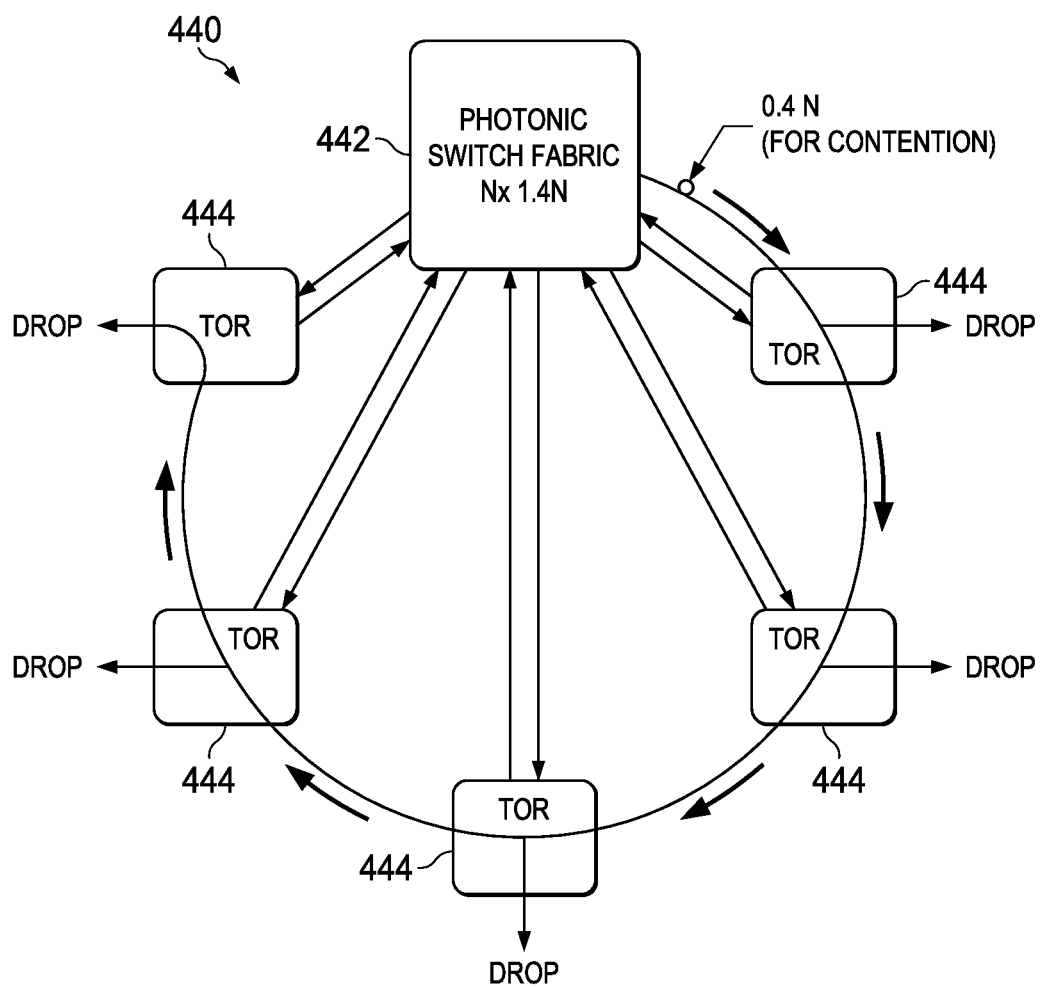
FIG. 16 illustrates an embodiment photonic switching architecture for contention resolution.

FIG. 16 illustrates system 440 for routing contended photonic packets. Photonic switching fabric 442 is an N×1.4N photonic switching fabric. In another example, photonic switching fabric 442 is an N×1.5N photonic switching fabric. Photonic switching fabric is coupled to TOR switches 444, which are coupled in a ring or daisy chain configuration. The ring capacity is equal to the extra dilation assumed in the photonic switch. In one example, the ring is a passive ring equipped with a splitter and amplifier. The deflected packet header may be examined by all ring nodes (TOR switches or TOR groups) and collected by the node if the packet destination address matches the node address or an address that belongs to the network attached to this node. Packets are directed to their destination by deflection to the photonic bufferless ring. The ring has a capacity of 0.4N, where 0.4 indicates the capacity of the ring, not the number of links. For example, if the interfaces are 100 Gbps and N=100, resulting in a 10 Tbps switch, the equivalent capacity of 0.4N interfaces is 40 interfaces of 100 Gbps. If the contention links are 1.28 Tbps links, three or four interfaces of 1.28 Tbps may be used to handle the contended traffic on the ring.

Figure 17:
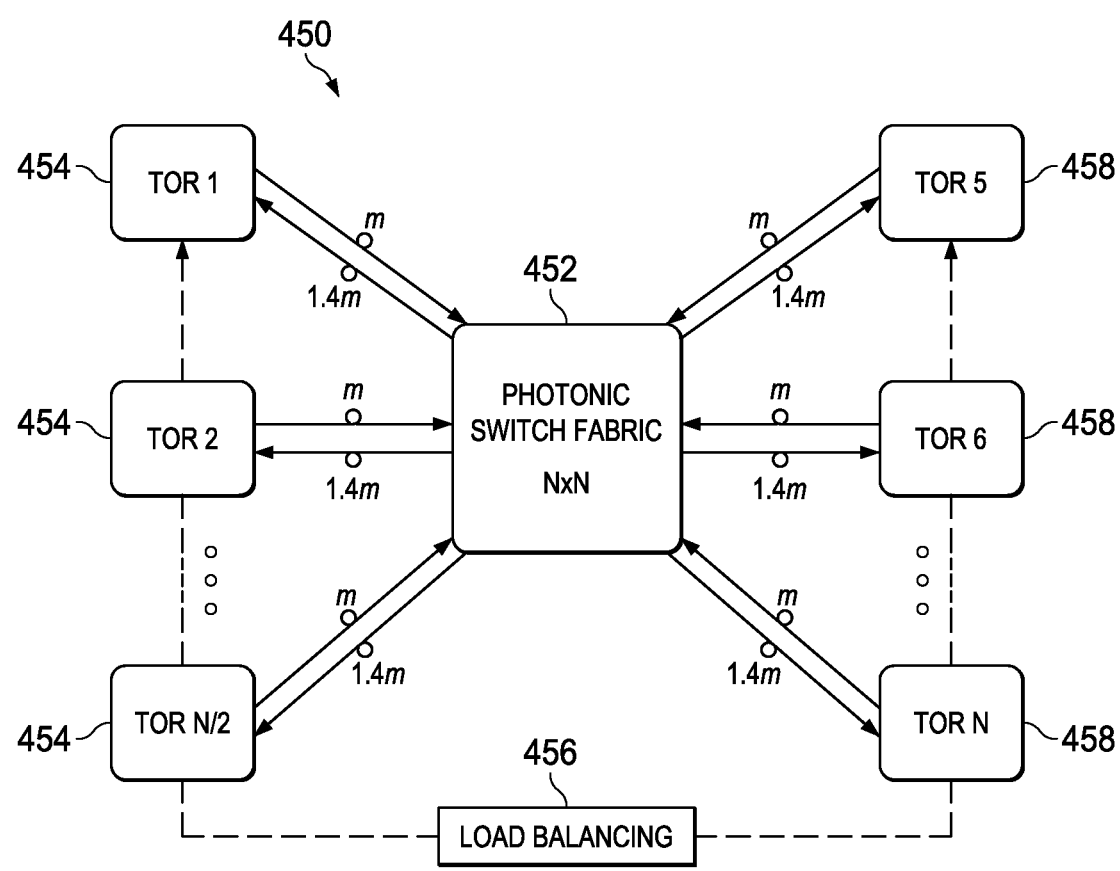
FIG. 17 illustrates another embodiment photonic switching architecture for contention resolution.

FIG. 17 illustrates system 450, another system for routing contended packets photonic packets in a photonic switching fabric. There are multiple interfaces between photonic switching fabric 452, an N×N photonic switching fabric, and TOR switches 454 and 458. The N interfaces of photonic switching fabric 452 have m links each. For example, if each interface is 100 G, it is composed of m=10 10 G links. In this case, there are 10 G interfaces (10 10 G interfaces) connecting a TOR switch to the photonic switch. There are at least 1.4*m*10 G interfaces (14 10 G interfaces) connecting the photonic switch to the TOR switches. Load balancer 456 balances the loads between TOR switches 454 and TOR switches 458. Load balancer 456 monitors the load of the links to determine if there is an overload situation for a TOR switch or a TOR group. If there is an overload situation, load balancer 456 makes a traffic balancing action to eliminate or minimize packet loss due to a contention that cannot be absorbed by the 40% additional links. The load balancer is optional.

Figure 18:
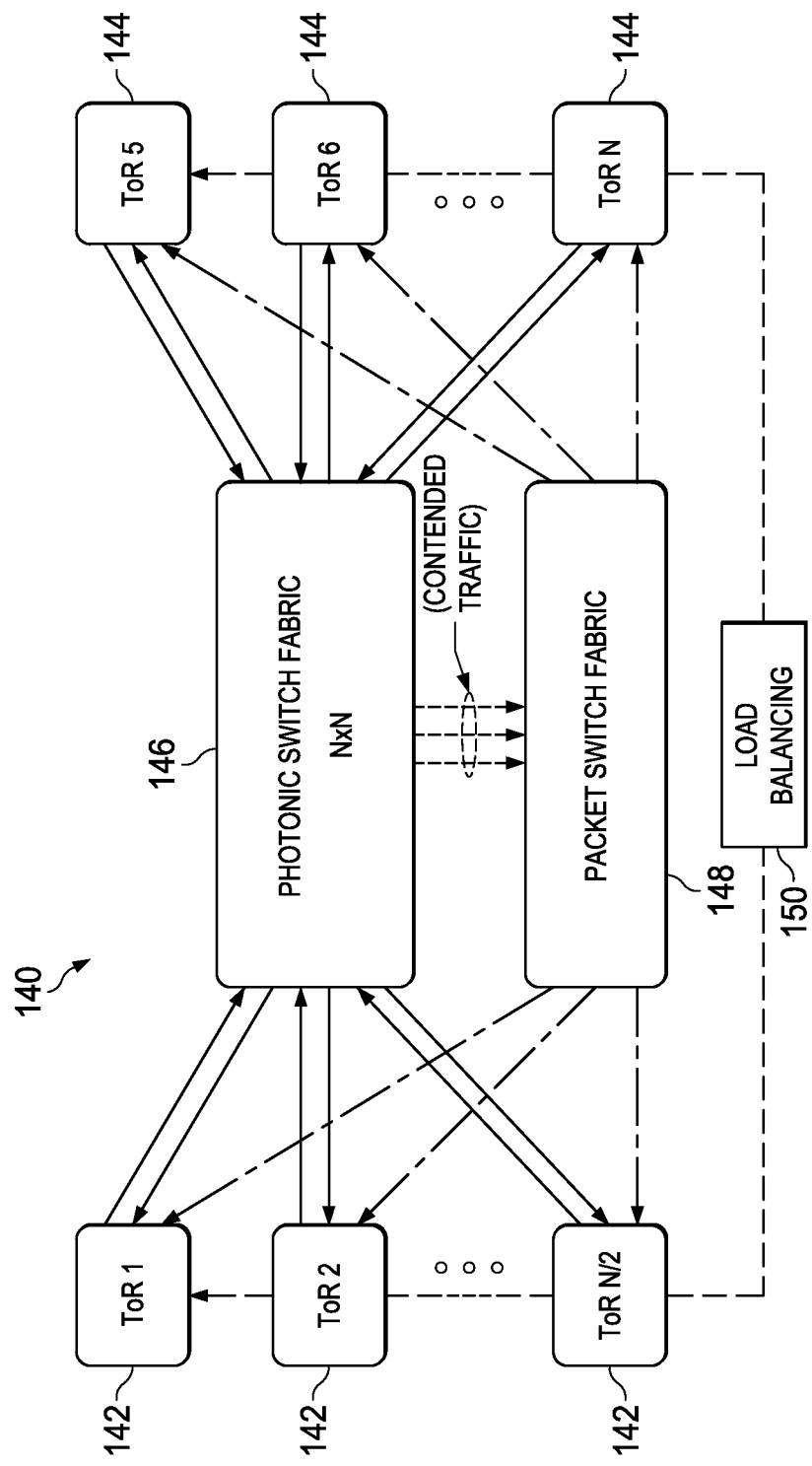
FIG. 18 illustrates an additional embodiment photonic switching architecture for contention resolution.

FIG. 18 illustrates system 140 for routing contended photonic packets with a second switch to handle the additional traffic. Photonic switching fabric 146, an N×N photonic switching fabric, is coupled to TOR switches 142 and 144. Load balancer 150 balances the loads among the links. Photonic packet switching fabric 146 receives photonic packets from the TOR switches. When the requested output port is not available, photonic switching fabric 146 routes the packet to switching fabric 148, which routes the contended packets. In one example, switching fabric 148 is a smaller photonic switch. Alternatively, switching fabric 148 is an electrical switch, and may contain buffering.

Figure 19:
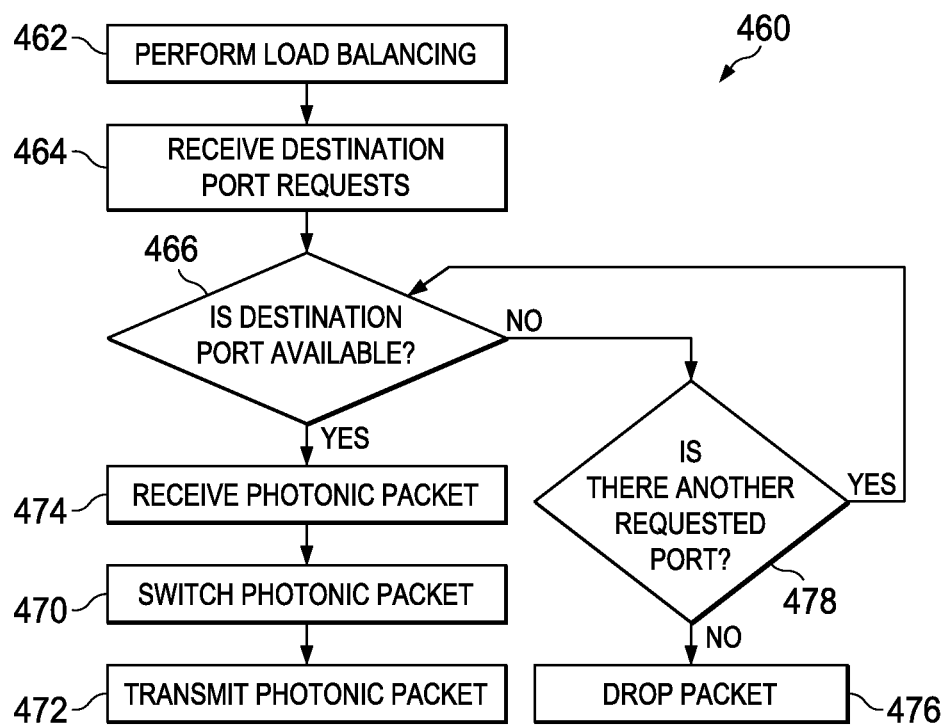
FIG. 19 illustrates a flowchart for an embodiment method of resolving contending photonic packets.

FIG. 19 illustrates flowchart 460 for a method of resolving contended photonic packets using deflection. Initially, in step 462, the photonic switching fabric performs load balancing. When one or more link(s) have a disproportionately high amount of traffic, the load is balanced so that traffic is transferred from overutilized links to underutilized links. Load balancing reduces the rate of dropped packets. The load balancer balances the data storage on the servers connected to TOR switches or TOR groups, so the traffic load on the output links of the photonic switch are uniformly distributed. Given that the data is stored as chunks in a data center with copies of each chunk in many locations, a method of load balancing involves fetching the data from a server connected to a TOR resulting in a balanced demand across switch outputs.

Next, in step 464, the photonic switching fabric receives a destination port request corresponding to a photonic packet to be switched. The destination port request may be in the form of a header. In one example, the header is wavelength encoded. The destination port request indicates which switching fabric and which output port(s) of the photonic packet switch has been requested. In one example, the destination port request indicates selection of an available output link between photonic packet switch and the destination. In other examples, the destination port request requests two, three, four, or more output ports going to the same destination. The output ports may be requested in their order of priority.

Then, in step 466, the photonic switching fabric determines whether the requested destination port is available at the requested time. The port is unavailable when it is being used to switch another photonic packet at that time. When, the requested port is available, the photonic switching fabric proceeds to step 474, and when the requested port is unavailable, the photonic switching fabric proceeds to step 478. In another example, all requested destination ports have the same priority.

In step 478, the photonic switching fabric determines if there is another output port to consider. When there are no output ports to be considered, the packet may be dropped in step 476. When the output port requests are prioritized, the photonic switching fabric considers the next requested output port in step 466.

In step 474, the photonic switch receives the photonic packet to be switched. The photonic packet is received from a TOR switch over an optical fiber.

Next, in step 470, the photonic packet is optically switched. In one example, the photonic packet is first switched by a 2×3 or 2×4 photonic switch to direct the photonic packet to the switching fabric which has been scheduled to connect the input to the desired output. Then, the photonic packet is switched by the switching fabric. The photonic packet switch is an optical space switch. In another example, the photonic packet is received by a large photonic switch. When the requested output port is available, the photonic switch is switched by the large photonic switch. When the requested output port is unavailable, the photonic packet is sent to a smaller switch which handles the overflow. The photonic packet is then switched by the smaller switch, which may be an optical switch or an electrical switch. Alternatively, only one switch is used.

Finally, in step 472, the switched photonic packet is transmitted. For example, the switched photonic packet is transmitted to a destination TOR switch along an optical fiber.

An embodiment photonic switching fabric asynchronously deflects photonic packets without the use of an optical buffer. An embodiment uses optical space switches instead of arrayed waveguide gratings (AWG). Single hop or multi-hop bufferless photonic space switches may be used. Buffering is performed at the TOR switches in the electrical domain, not in the photonic switching fabric in the optical domain.

Figure 20:
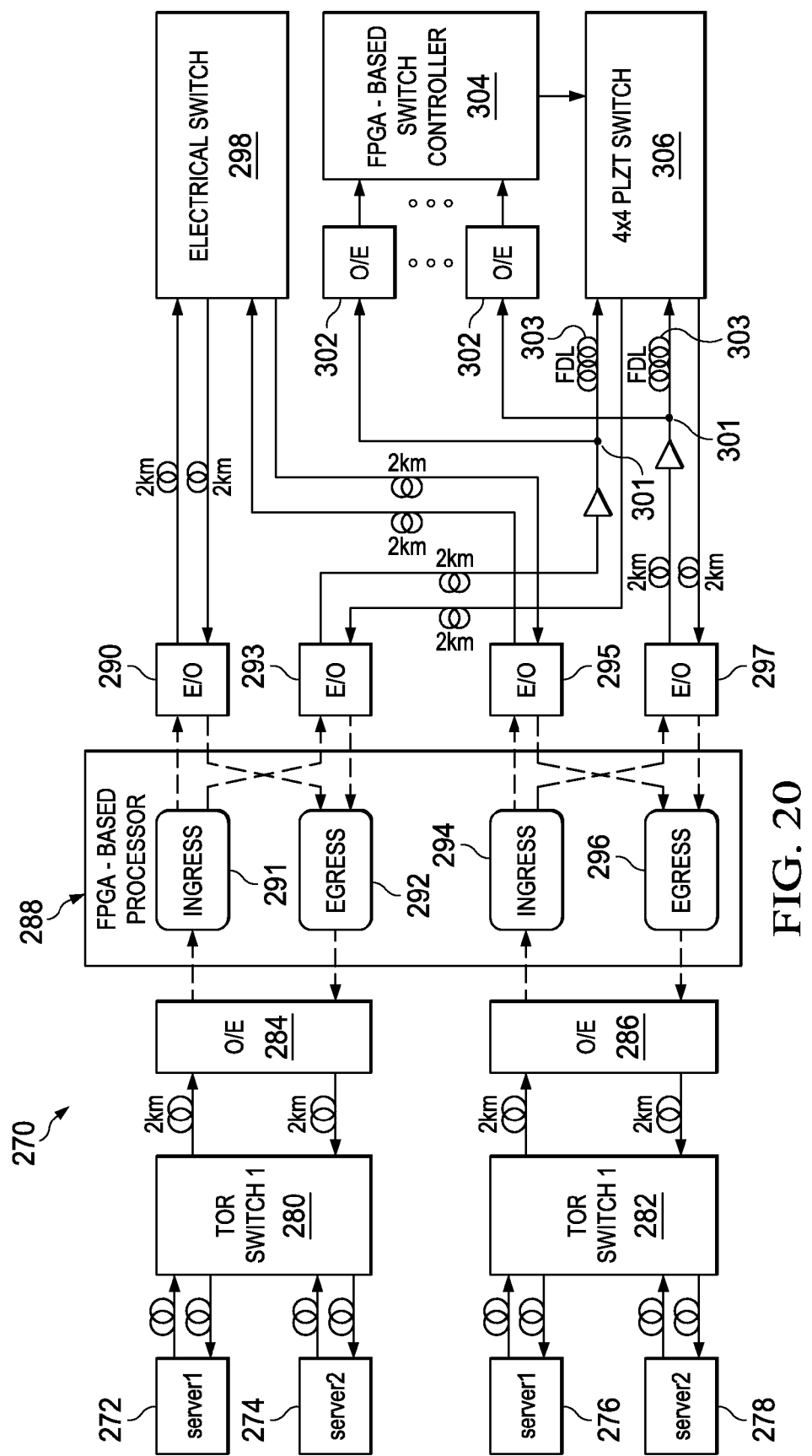
FIG. 20 illustrates an embodiment system for hybrid photonic packet switching.

FIG. 20 illustrates embodiment system 270 with electrical switch 298 and photonic switch 306, where short packets are switched by electrical switch 298 and long packets are switched by photonic switch 306. An embodiment system separates short packets from long packets. Contention resolution can be applied for the photonic switch of system 270. Additional details on a packet switching system where short packets are switched by an electrical switch and fast packets are switched by a photonic switch are discussed in U.S. patent application Ser. No. 13/902,008 filed on May 24, 2013, and entitled "System and Method for Steering Packet Streams," which application is hereby incorporated herein by reference.

Servers 272 and 274 are coupled to TOR switch 280, while servers 276 and 278 are coupled to TOR switch 282. The optical signals for TOR switch 280 and TOR switch 282 are converted to the electrical domain by optical-to-electrical converters 284 and 286, respectively.

Processor 288, a field-programmable gate array (FPGA) that may be part of TOR switches 280 and 282, processes the packets. Incoming packets are processed by ingress 291 and ingress 294, while outgoing packets are processed by egress 292 and egress 296. The links between TOR switches 280 and 282 and processor 288 are 10 Gigabit Ethernet. In ingress 291 and ingress 294, the long packets are separated from the short packets. Long packets are prepared for photonic switching by resolving packet contention. Contending long packets are handled by contention control in 288. After the contention is resolved, the packets are compressed, bitwise scrambled, and a photonic destination label is added. A label is followed by a scrambled media access control (MAC) frame. By compressing the long packets, there is sufficient inter-packet gap for the insertion of the photonic label, and there is more time for the photonic switch connection set-up and for receiver synchronization at the destination aggregation switch. The packet compression is achieved by raising the clock rate on the output physical layer. The long packets are 10% overclocked at 11.35 Gb/s. The label is a short pattern at 11.35 Gb/s. Additional details on the packet compression are provided by U.S. patent application Ser. No. 13/901,944 filed on May 24, 2013, and entitled "System and Method for Accelerating and Decelerating Packets," which application is hereby incorporated herein by reference.

In egress 292 and egress 296, the reverse operation is performed. The photonic long packets and the electronic short packets are received. The packets are re-ordered and forwarded as internet protocol (IP)/Ethernet packets towards the destination TOR switches.

The processed packets are then converted from the electrical domain to the optical domain by electrical-to-optical converters 290, 293, 295, and 297. Short packets are routed to electrical-to-optical converters 290 and 295 and proceed to be switched by electrical switch 298.

Long packets are routed to photonic switch 306, a 4×4 Lead-Lanthanum-Zirconate-Titanate (PLZT) photonic switch. The switching time of photonic switch 306 is about 10-20 ns. Fiber splitters 301 direct 10% of the power to optical-to-electrical converters 302. The electrical signals are used to control photonic switch 306 by switch controller 304, an FPGA based switch controller. Fiber delay lines 303 delay the signal long enough for the switch controller to read the photonic label and set the switch connection before the packet arrives.

Figure 21A:
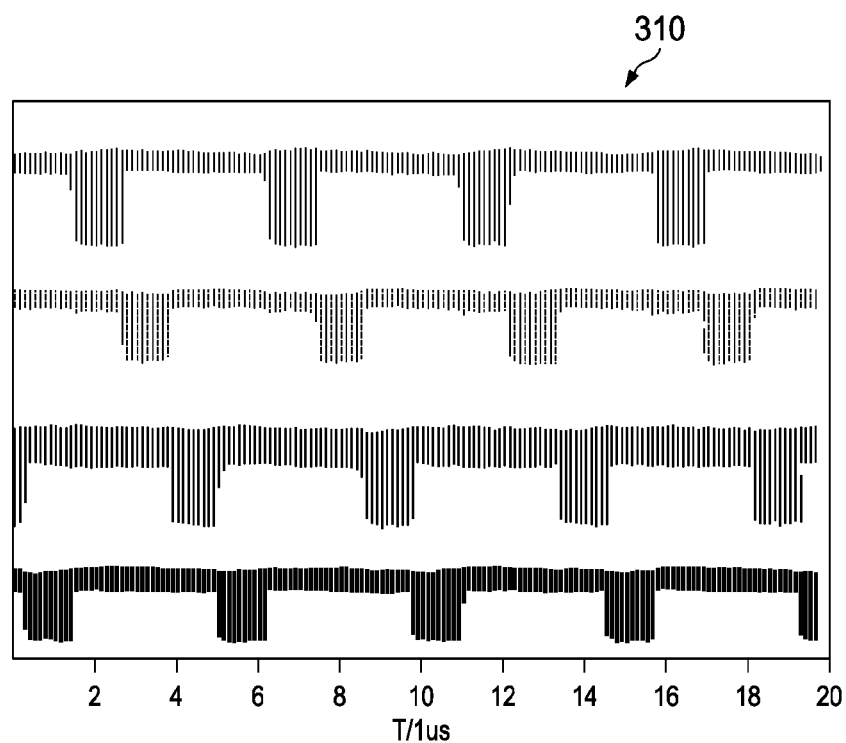
FIGS. 21A-C illustrate waveforms and an eye diagram for a photonic packet switching system.
Figure 21B:
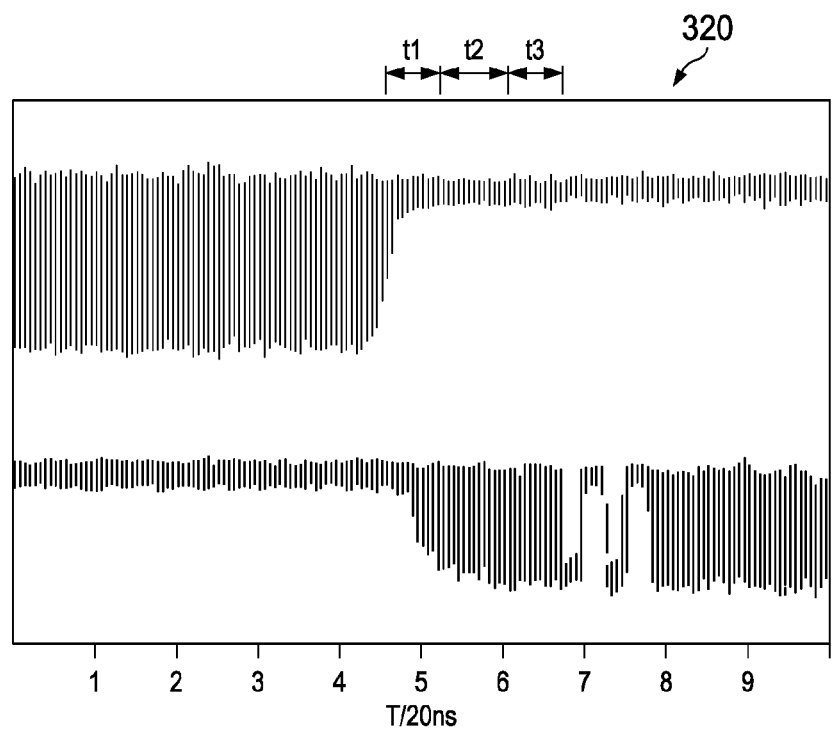
Figure 21C:
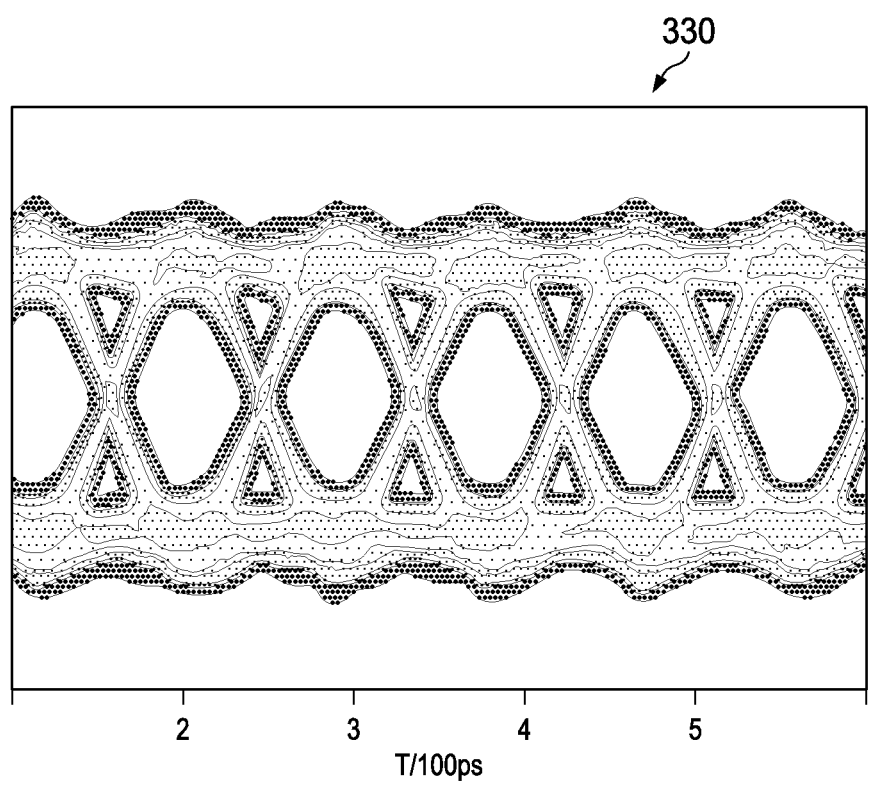

FIGS. 21A-C illustrate results from system 270 in FIG. 20. Server 272 sends Ethernet packets with four different destination MAC addresses, each destined to a different photonic output port of photonic switch 306. FIG. 21A illustrates graph 310 with the packet waveform on the four output ports of photonic switch 306. The photo-receiver voltage polarity is inverted, with horizontal lines when there is no light and the waveforms when there are switched packets.

FIG. 21B illustrates graph 320 with a detailed output packet waveform of output ports 1 and 2 of photonic switch 306. Output 1 completes a photonic frame transmission, and output 2 starts sending a preamble and photonic label. Switch response time is 12 ns, residual preamble for receiver synchronization is 15 ns, and start frame delimiter (SFD) time is 12 ns.

FIG. 21C illustrates graph 330 with an eye diagram of the switched signal. Because the total processing time is 130 ns, the latency for control processing is approximately 130 ns minus the switch response time minus the residual preamble time, or 103 ns. This delay can be compensated for by a 21 m delay line.

Figure 22:
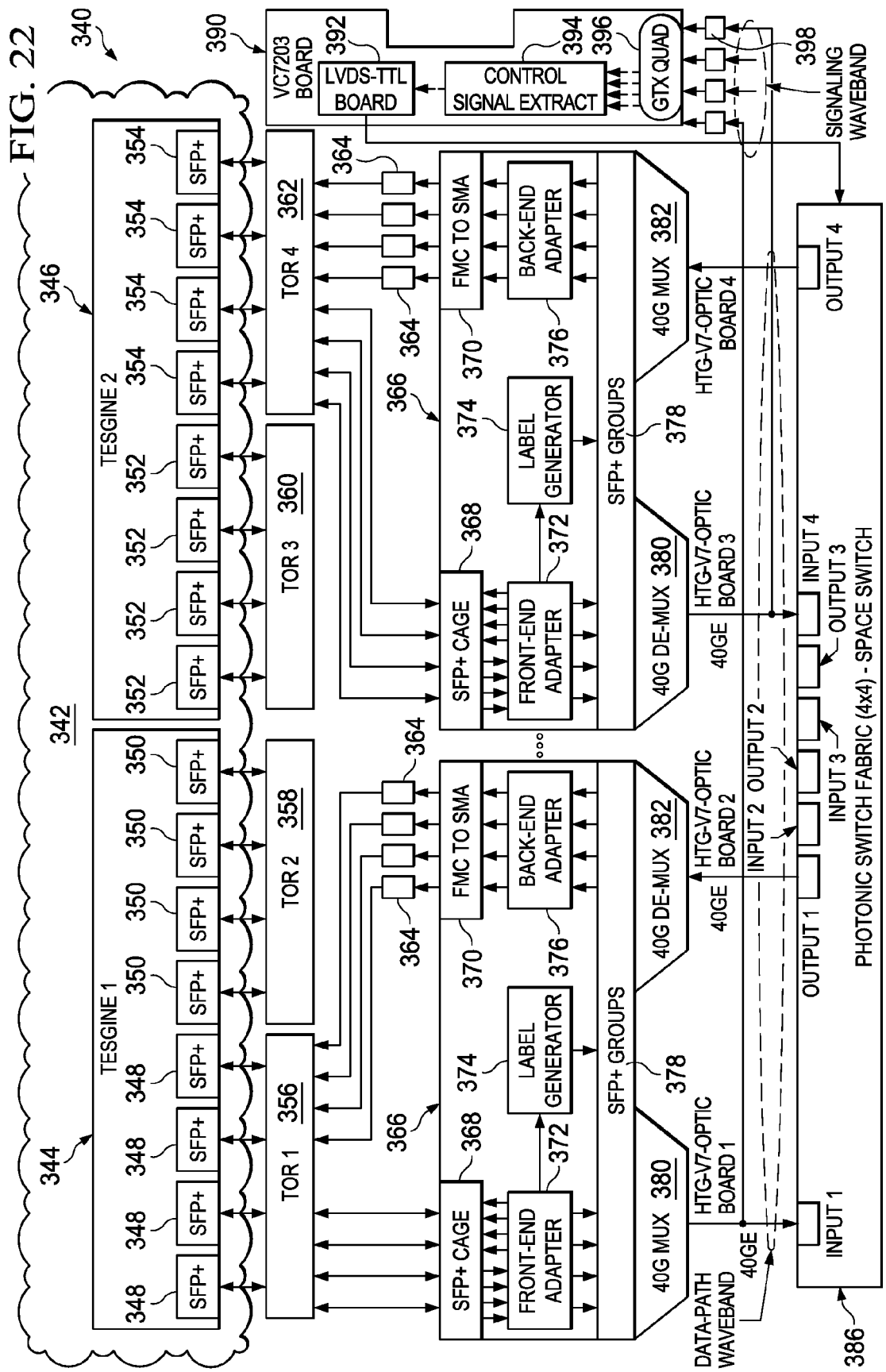
FIG. 22 illustrates another embodiment system for photonic packet switching.

FIG. 22 illustrates system 340, an embodiment photonic switching system that uses optical space switching. System 340 may be an implementation of photonic switching system 160 in FIG. 7. Separate wavebands are used for the control signal path and the payload data path. Photonic routing labels are used on the forward path. Signaling on the return path is used for contention control and synchronization.

System 340 uses an embodiment by deploying 2 inputs of the photonic switch and 4 outputs. The additional outputs carry the contented packets.

Server network 342 is simulated by simulator 344 and simulator 346. Simulators 344 and 346 contain small form factor pluggable transceivers (SFPs) 348, 350, 352, and 354, which are connected to TOR switches 356, 358, 360, and 362. The signals are sent to FPGA 366.

In FPGA 366, signals are received by SFP 368. These signals are proceed by front-end adaptor 372. Labels are generated by label generator 374. The signals and groups are output by SFP 378 to photonic switching fabric 386 and FPGA 390.

The optical signal of the labels is converted to an electrical signal by optical-to-electrical converters 398, and is received by FPGA 390. They are processed by processor 396. Then, the control signal is extracted by control signal extractor 394. The control signals are then converted by low-voltage differential signal (LVDS) to transistor-transistor logic (TTL) board 392.

The data wave path signals and the signaling wave path signals are multiplexed by multiplexer 380, with data at 40 GE and signaling at 10 GE, and output to photonic switching fabric 386. The control signals from FPGA 390 are also input to photonic switching fabric 386. Photonic switching fabric 386 is a 4×4 optical space switch. The signals are switched, and output to FPGA 366.

The signals are received by demultiplexer 382 and SFP 378. They are processed by back-end adaptor 376. The signals are converted by FPGA mezzanine card (FMC) to subminiature version A (SMA) converter 370. The signals are converted to optical signals by electrical-to-optical converters 364, and proceed to TOR switches 356, 358, 360, and 362.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of photonic packet switching, the method comprising:
receiving, by a bufferless photonic switching fabric from a first top-of-rack (TOR) switch, a destination port request indicating a first photonic packet to be switched, a first period of time during which to switch the first photonic packet, and a first output port for routing the first photonic packet;

determining whether the first output port is available during the first period of time;

receiving, by the bufferless photonic switching fabric from the first TOR switch, the first photonic packet;

in response to the first output port not being available during the first period of time, routing the first photonic packet to an alternative output port, wherein the first output port and the alternative output port are coupled to a same destination TOR switch, and transmitting the first photonic packet from the alternative output port to the destination TOR switch.

2. The method of claim 1, further comprising load balancing a plurality of TOR switches coupled to the bufferless photonic switching fabric, wherein the plurality of TOR switches comprises the first TOR switch.

3. The method of claim 1, wherein the destination port request comprises a second output port, wherein determining whether the first output port is available during the first period of time comprises determining whether the second output port is available during the first period of time, and wherein the alternative output port is the second output port.

4. The method of claim 1, wherein routing the first photonic packet to the alternative output port comprises:
routing the first photonic packet to an alternative packet switch; and
switching the first photonic packet by the alternative packet switch.

5. The method of claim 1, wherein determining whether the first output port is available during the first period of time comprises determining whether a second photonic packet from a second photonic switch is routed to the first output port during the first period of time.

6. A photonic switching fabric comprising:
a first bufferless photonic switch; and
a switch controller coupled to the first bufferless photonic switch, wherein the first bufferless photonic switch is configured to be coupled to a plurality of top-of-rack (TOR) switches,
wherein the first bufferless photonic switch comprises a first plurality of input ports and a second plurality of output ports,
wherein the second plurality of output ports is greater than the first plurality of input ports,
wherein the switch controller is configured to determine whether a first output port is available during a first period of time in accordance with a first destination port request,
wherein the first bufferless photonic switch is configured to connect a first input port to the first output port and transmit a first packet indicated by the destination port request to a destination TOR switch, when the first output port is available during the first period of time,
wherein the first bufferless photonic switch is configured to connect the first input port to a second output port and transmit the first packet indicated by the destination port request to the destination TOR switch, when the first output port is not available during the first period of time, and
wherein the first output port and the second output port are configured to be coupled to the destination TOR switch.

7. The photonic switching fabric of claim 6, further comprising a label detector configured to decode the first destination port request.

8. The photonic switching fabric of claim 6, wherein the first bufferless photonic switch is further configured to be coupled to a load balancer.

9. The photonic switching fabric of claim 6, wherein the second plurality of output ports is at least 1.35 times the first plurality of input ports.

10. The photonic switching fabric of claim 9, wherein the second plurality of output ports is at least twice the first plurality of input ports.

11. The photonic switching fabric of claim 6, wherein the plurality of TOR switches is configured in a ring.

12. The photonic switching fabric of claim 6, further comprising a second switch coupled to the first bufferless photonic switch.

13. The photonic switching fabric of claim 12, wherein the second switch is a second photonic switch.

14. The photonic switching fabric of claim 12, wherein the second switch is an electrical switch.

15. The photonic switching fabric of claim 12, wherein the second output port of the first bufferless photonic switch is configured to be coupled to the destination TOR via the second switch.

16. The photonic switching fabric of claim 6, wherein the first bufferless photonic switch is a silicon photonic switch.

17. The photonic switching fabric of claim 6, wherein the first bufferless photonic switch is an optical space switch.

18. The photonic switching fabric of claim 6, wherein the photonic switching fabric is configured to be coupled to a software defined networking (SDN) controller.

19. A photonic switching fabric comprising:
a bufferless photonic packet switch; and
a plurality of input photonic switches comprising a first input photonic switch, wherein the plurality of input photonic switches is coupled to the bufferless photonic packet switch, wherein the plurality of input photonic switches is configured to be coupled to a plurality of top-of rack (TOR) switches comprising a first TOR switch, wherein the first input photonic switch is configured to direct a first photonic packet from the first TOR switch to the bufferless photonic packet switch when a first output port of the bufferless photonic packet switch is available during a first period of time, and wherein the first input photonic switch is configured to return the first photonic packet to the first TOR switch without the first photonic packet passing through the bufferless photonic packet switch, when the first output port of the photonic switching fabric is not available during the first period of time.

20. The photonic switching fabric of claim 19, further comprising a switch controller coupled to the plurality of input photonic switches, wherein the switch controller is configured to receive a first destination request comprising the first output port, and wherein the switch controller is configured to determine whether the first output port is available during the first period of time.

21. The photonic switching fabric of claim 19, wherein the first input photonic switch is a 2:1 photonic switch.

22. The method of claim 1, further comprising:
receiving, by the bufferless photonic switching fabric from the first TOR switch, a second destination port request indicating a second photonic packet to be switched, a second period of time during which to switch the second photonic packet, and the first output port for routing the second photonic packet;
determining whether the first output port is available during the second period of time;

receiving, by the bufferless photonic switching fabric from the first TOR switch, the second photonic packet; and in response to the first output port being available during the second period of time, routing the second photonic packet to the first output port.

* * * * *